US012156848B2

(12) United States Patent
Eveleigh et al.

(10) Patent No.: US 12,156,848 B2
(45) Date of Patent: *Dec. 3, 2024

(54) ENCLOSED EMERGENCY WASH CABINETS

(71) Applicant: Magarl, LLC, Naples, FL (US)

(72) Inventors: Robert B. Eveleigh, Naples, FL (US); Cameron J. West, Greenfield, IN (US); Thomas R. Baker, Morgantown, IN (US); Calab Williams, Indianapolis, IN (US)

(73) Assignee: Magarl, LLC, Naples, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/207,824

(22) Filed: Jun. 9, 2023

(65) Prior Publication Data

US 2023/0310267 A1 Oct. 5, 2023

Related U.S. Application Data

(63) Continuation of application No. 16/948,667, filed on Sep. 28, 2020, now Pat. No. 11,690,783.

(60) Provisional application No. 62/906,896, filed on Sep. 27, 2019.

(51) Int. Cl.

*A61H 35/02* (2006.01)
*A47K 3/28* (2006.01)
*A61H 33/00* (2006.01)

(52) U.S. Cl.

CPC ............... *A61H 35/02* (2013.01); *A47K 3/28* (2013.01); *A61H 33/005* (2013.01); *A61H 33/0095* (2013.01); *A61H 33/6005* (2013.01)

(58) Field of Classification Search

CPC .. A61H 35/02; A61H 33/005; A61H 33/0095; A61H 33/6005

USPC .............................................................. 4/597

See application file for complete search history.

(56) References Cited

U.S. PATENT DOCUMENTS

| | | | | |
|---|---|---|---|---|
| 4,939,800 A * | 7/1990 | Fiorentino | A61H 35/02 | 4/620 |
| 5,157,798 A * | 10/1992 | Van Kammen | A61H 35/02 | 4/620 |
| 5,381,567 A * | 1/1995 | Tanner | A62B 29/00 | 4/620 |
| 6,296,626 B1 * | 10/2001 | Stein | A61H 35/02 | 604/294 |
| 6,711,758 B1 * | 3/2004 | Terek | A61H 35/02 | 4/620 |
| 11,690,783 B2 * | 7/2023 | Eveleigh | A47K 3/286 | 4/597 |
| 2005/0273925 A1 * | 12/2005 | Taylor | A61H 35/02 | 4/620 |
| 2008/0172787 A1 * | 7/2008 | Tao | A61H 35/02 | 368/10 |
| 2017/0164789 A1 * | 6/2017 | Joyer | A61H 33/00 | |
| 2017/0258680 A1 * | 9/2017 | Eveleigh | A61H 33/60 | |

* cited by examiner

*Primary Examiner* — Huyen D Le

(74) *Attorney, Agent, or Firm* — John V. Daniluck; Dentons Bingham Greenebaum LLP

(57) ABSTRACT

Various apparatus and methods for providing emergency washing including means for discouraging tampering of the various valves.

26 Claims, 17 Drawing Sheets

ENCLOSED EMERGENCY WASH CABINETS

CROSS REFERENCE TO RELATED APPLICATION

This application is a continuation of U.S. patent application Ser. No. 16/948,667, filed Sep. 28, 2020, which claims the benefit of priority to U.S. Provisional Patent Application Ser. No. 62/906,896, filed Sep. 27, 2019, titled ENCLOSED EMERGENCY WASH CABINETS, incorporated herein by reference.

FIELD OF THE INVENTION

Various inventions are disclosed herein that pertain to systems and methods for emergency washing of a person, and in particular to arrangements of enclosures for the various components.

SUMMARY OF THE INVENTION

One aspect of the present invention pertains to a system for emergency washing. Other embodiments include a first enclosure having an emergency eyewash assembly, a door attached to the eyewash assembly, the first enclosure including a shutoff valve and a drain. Yet other embodiments include a shower. Still other embodiments include a second lockable enclosure, a thermostatically controlled mixing valve located within the second enclosure, the mixing valve including an inlet for hotter water, and inlet for colder water, and an outlet for mixed water. Still other embodiments include a first fluid flowpath providing fluid communication from the mixing valve outlet to the shutoff valve inlet, and a second fluid flowpath providing fluid communication from the bottom of the second enclosure to the drain.

In some embodiments, the use of lockable doors provides means for discouraging any unauthorized tampering with the devices within the locked enclosure. In still further embodiments, the means for discouraging tampering includes one or more externally accessible handle for actuating an emergency wash when the enclosure is locked. In still further embodiments, the means for discouraging tampering includes one or more shutoff valve handles located within the interior. These handles can only be actuated when the door is unlocked, and when actuated the actuated position of the handle prevents closure and/or locking of the door.

Another aspect of the present pertains to a system for emergency washing. Other embodiments include an enclosure having a locking door the protects a first enclosed volume and including a mixing valve located in the first volume, the mixing valve including an inlet for hotter water, and inlet for colder water, and an outlet for mixed water. Yet other embodiments include a bottom cabinet located underneath the top enclosure and having a pivoting emergency eyewash assembly in fluid communication with the outlet, and a tray adapted and configured to collect water spraying from the eyewash assembly, the bottom enclosure including a drain.

Another aspect of the present invention pertains to a system for emergency washing. Other embodiments include a cabinet having a door that the protects a first enclosed volume and including a first valve located in the first volume, the first valve including a first inlet for water, a first outlet for providing water from the inlet, and second outlet for providing water from the inlet, the first valve being actuatable between a first position placing the first inlet and first outlet in fluid communication and a second position placing the first inlet and second outlet in fluid communication. Yet other embodiments include a second cabinet and having a readily movable emergency eyewash assembly in fluid communication with the first outlet, and a tray adapted and configured to collect water spraying from the eyewash assembly, the bottom enclosure including a drain in fluid communication with the second outlet.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions. Further, the figures shown herein have been created from scaled drawings, scaled models, or from photographs that are scalable. It is understood that such dimensions, or the relative scaling within a figure, are by way of example, and not to be construed as limiting unless so stated in a claim. Persons of ordinary skill will also recognize that CAD renderings may include lines that pertain to changes in the computer model, and not necessarily to component features.

ELEMENT NUMBERING

Figure 1:
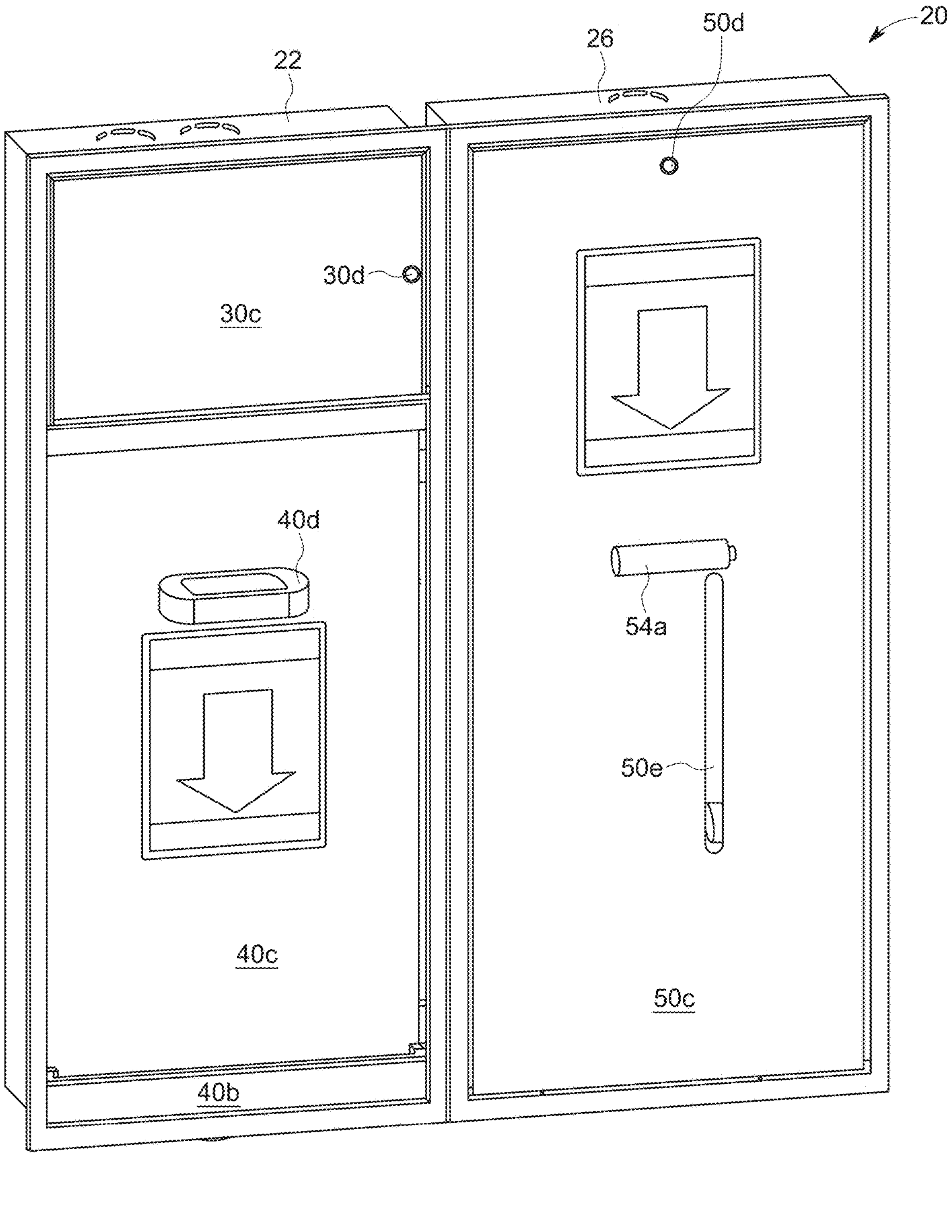
FIG. 1 is a front, top, side perspective photographic rendering of emergency eyewash cabinets shown closed according to one embodiment of the present invention.

The following is a list of element numbers used with all of the embodiments, and at least one noun used to describe that element. The "X" for all of these numbers is removed or replaced with a number (0 or greater) in the text and drawings of this application. Consistent with statements made elsewhere in this specification, these various 2-digit element numbers are used among multiple embodiments, and aspects of a particular element stated for one embodiment can be applied to the same element number in a different embodiment, except as shown and described differently, and as would be understood by a person of ordinary skill in the art. It is understood that none of the embodiments disclosed herein are limited to these nouns, and these element numbers can further include other words that would be understood by a person of ordinary skill reading and reviewing this disclosure in its entirety.

| | |
|---|---|
| X20 | emergency wash system |
| X22 | enclosed eyewash cabinet |
| X26 | enclosed shower cabinet |
| X28 | tubing; conduit |
| X30 | top enclosure |
| a | sides |
| b | bottom |
| c | door |
| d | lock |
| e | aperture, flow communication |
| X32 | thermostatically controlled mixing valve |
| a | hot inlet |
| b | cold inlet |
| c | tempered outlet |
| d | temperature gauge |
| X37 | heater |
| X38 | shut off valve |
| X39 | valve |
| a | tempered water inlet |
| b | flushing outlet |
| c | tempered outlet |
| d | flushing conduit |
| e | flush activation lever |
| X40 | bottom enclosure |
| a | sides |
| b | bottom |
| c | door |
| d | handle |
| e | aperture, flow communication |
| f | elevational angle |
| g | door stop |
| X41 | drainage basin; tray |

-continued

| | |
|---|---|
| a | sides |
| b | hinge |
| c | slot; track |
| d | support pin |
| e | elevation angle |
| f | linkage attachment pivot joint |
| X42 | eyewash assembly |
| a | left eyewash |
| b | right eyewash |
| X44 | swing down arm |
| a | inlet |
| X46 | shutoff valve |
| a | stationary member |
| b | pivoting member |
| c | actuating linkage |
| X48 | drain |
| X50 | adjacent enclosure |
| a | sides |
| b | bottom |
| c | door |
| d | lock |
| e | aperture; slot |
| f | slot |
| X52 | thermostatically controlled mixing valve |
| a | hot inlet |
| b | cold inlet |
| c | tempered outlet |
| d | temperature gauge |
| c | tempered outlet to other enclosure |
| X54 | outlet shut off valve |
| a | pull down arm, shower tempered flow |
| b | actuating linkage |
| c | outlet to shower |
| X56 | inlet shut off valves |
| a | hot |
| b | cold |
| c | lever |
| d | actuating linkage |
| X57 | heater |
| x58 | flushing valve |
| a | knob |
| b | outlet |

DETAILED DESCRIPTION OF ONE OR MORE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention, and further permits the reasonable and logical inference of still other embodiments as would be understood by persons of ordinary skill in the art.

It is understood that any reference to "the invention" is a reference to an embodiment of a family of inventions, with no single embodiment including an apparatus, process, or composition that should be included in all embodiments, unless otherwise stated. Further, although there may be discussion with regards to "advantages" provided by some embodiments of the present invention, it is understood that yet other embodiments may not include those same advantages, or may include yet different advantages. Any advantages described herein are not to be construed as limiting to any of the claims. The usage of words indicating preference, such as "various embodiments" or "preferably," refers to features and aspects that are present in at least one embodiment, but which are optional for some embodiments, it therefore being understood that use of the word "preferably" implies the term "optional.".

The use of an N-series prefix for an element number (NYY.YY) refers to an element that is the same as the non-prefixed element (YY.YY), except as shown and described. As an example, an element 1020.1 would be the same as element 20.1, except for those different features of element 1020.1 shown and described. Further, common elements and common features of related elements may be drawn in the same manner in different figures, and/or use the same symbology in different figures. As such, it is not necessary to describe the features of 1020.1 and 20.1 that are the same, since these common features are apparent to a person of ordinary skill in the related field of technology. Further, it is understood that some features 1020.1 and 20.1 may be backward compatible, such that a feature of a later discussed embodiment (NYY.YY) may include features compatible with other various embodiments that were discussed earlier (MYY.YY), as would be understood by those of ordinary skill in the art. This description convention also applies to the use of prime ('), double prime ("), triple prime (''') and star or asterisk (*) suffixed element numbers. Therefore, it is not necessary to describe the features of 20.1, 20.1', 20.1", 20.1''' and 20* that are the same, since these common features are apparent to persons of ordinary skill in the related field of technology.

Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise explicitly noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

What follows are paragraphs that express particular embodiments of the present invention. In those paragraphs that follow, some element numbers are prefixed with an "X" indicating that the words pertain to any of the similar features shown in the drawings or described in the text. However, those of ordinary skill in the art will recognize various other non-X prefixed element numbers that discuss features applicable to other embodiments. If any of the discussion that follows makes reference to X-prefixed element numbers, the drawing may use those same element numbers without the X-prefix, or with the N-series prefix described above.

FIGS. 1-9 show various views of an emergency wash system 20 according to one embodiment of the present invention. System 20 includes one or more enclosed eyewash cabinets 22, and preferably an enclosed shower cabinet 26. In one embodiment, the eyewash cabinets 22 include a lockable top enclosure 30 located at least partly above a bottom enclosure 40. The enclosed shower cabinet 26 preferably includes a single shower enclosure 50 located adjacent to one or both of the top or bottom enclosures 30 and 40, respectively. However, it is understood that yet other embodiments of the present invention contemplate having a single eyewash enclosure located adjacent to a single shower enclosure. Preferably, an enclosure including an eyewash assembly X42 is not lockable, such that the eyewash can preferably be accessed at all times. However, in various embodiments those enclosures including a thermostatically controlled valve, diverting valve, or electrical water heater are lockable, so as to protect these components from unauthorized adjustment.

Figure 2:
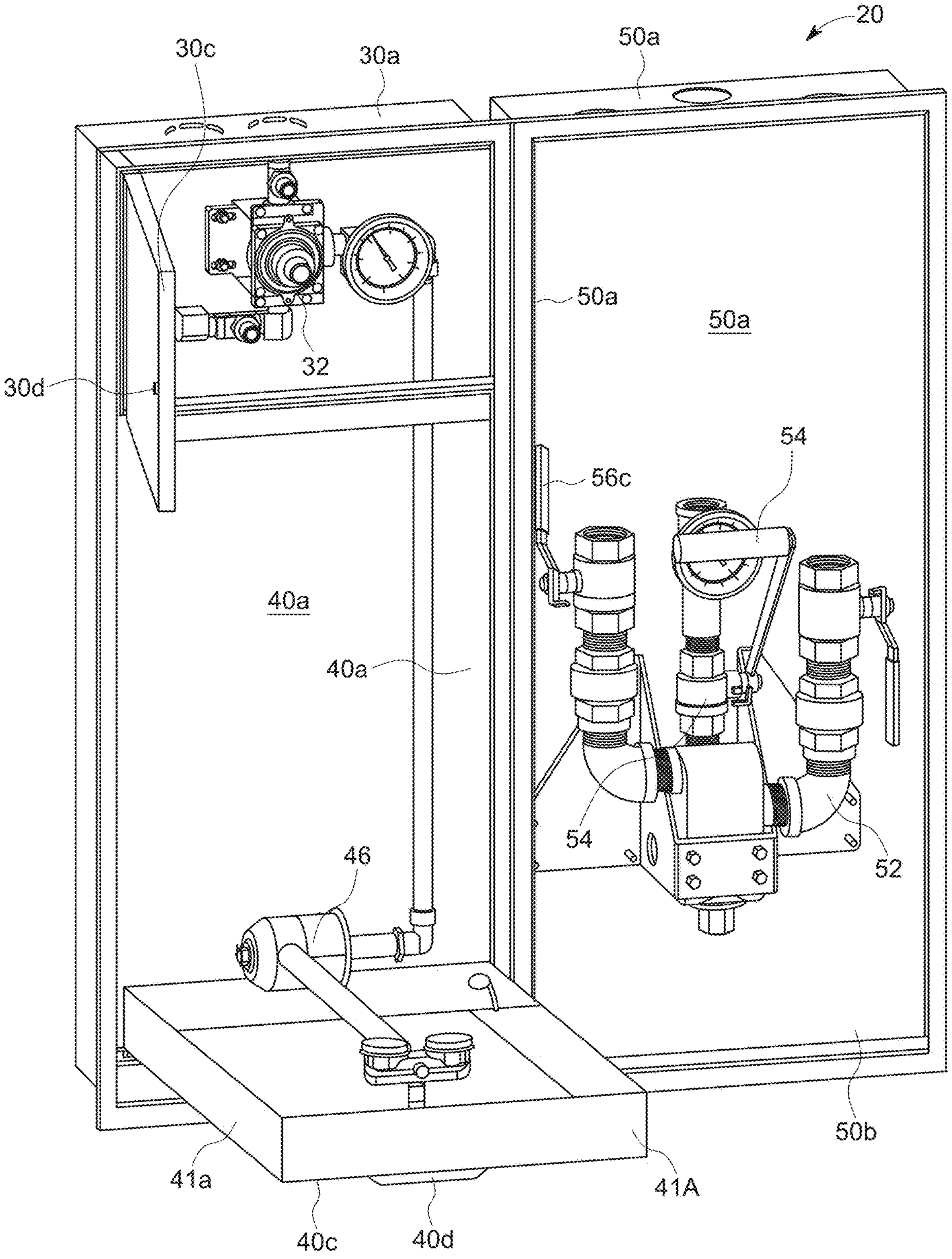
FIG. 2 shows the apparatus of FIG. 1 with two of the doors opened and one of the doors removed.

Preferably, system 20 includes a top enclosure 30 having a door 30*c* and lock 30*d* that protect the contents of the internal volume of the top enclosure. As shown in FIGS. 1 and 2, top enclosure 30 includes a plurality of sides 30*a* and a bottom 30*b* that coact with lockable door 30*c* to create a lockable interior. In some embodiments, the enclosures discussed herein are adapted and configured to be attached to a wall. In still further embodiments, the enclosure is mounted within a recess of the wall, such that the enclosure doors are substantially flush with the wall outer surface. As shown in FIG. 2, the top enclosure can include a thermostatically controlled mixing valve 32 that is located within the locked volume so as to minimize unauthorized tampering with the settings of the thermostatic valve.

Figure 3:
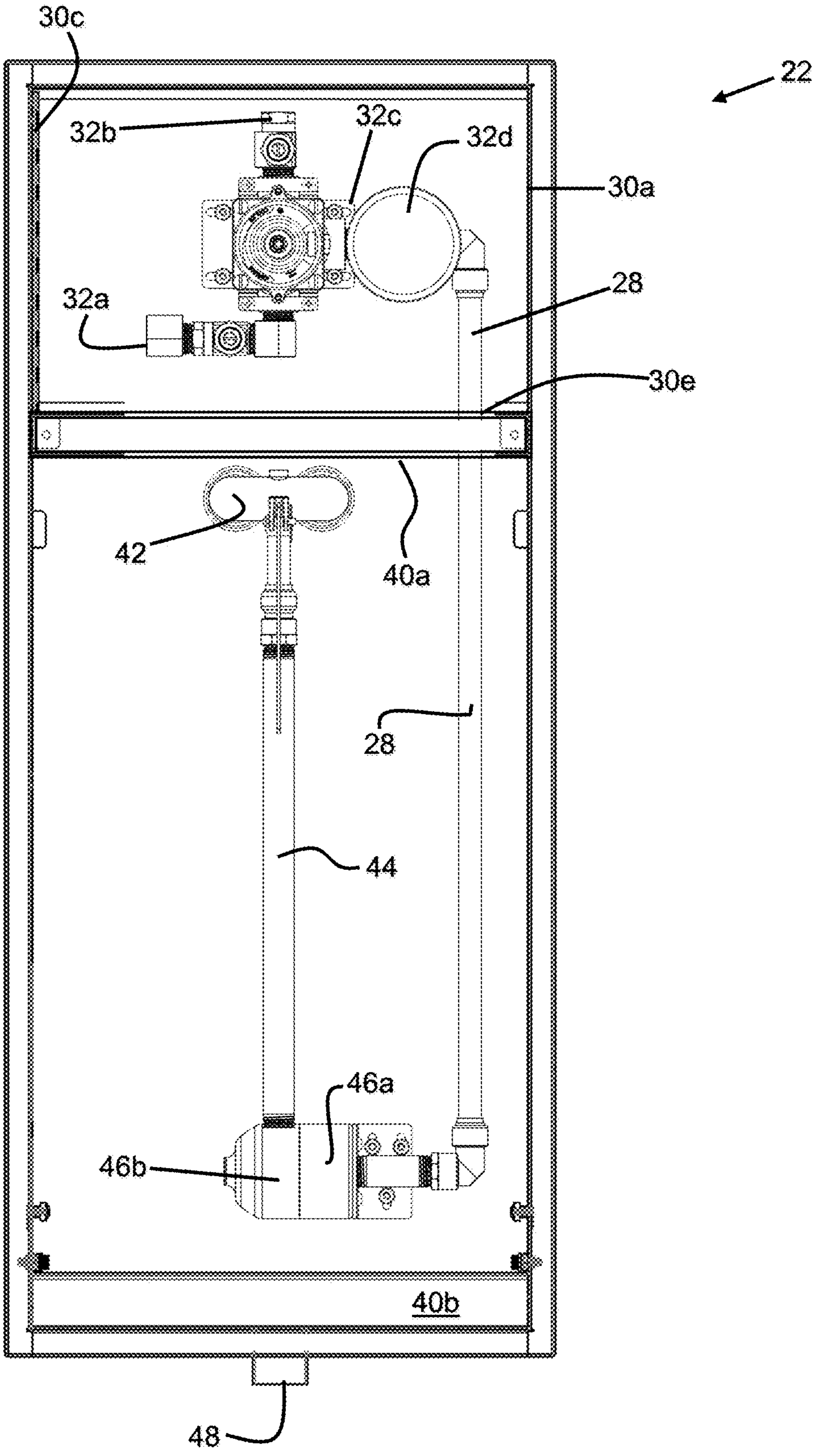
FIG. 3 is a front elevational view of a portion of the apparatus of FIG. 2, with one door shown open and another door shown removed.

Referring to FIG. 3, it can be seen that the top enclosure 30 includes a mixing valve 32 having a hot water inlet 32*a*, cold water inlet 32*b*, and a mixed water outlet 32*c* providing tempered water that flows past a temperature gage 32*d*. It is understood that preferably the supplies of hot and cold water are external to the enclosure, and not shown. Tempered water exiting from outlet 32*c* is provided to a conduit 28 that extends through a flow communication aperture 30*e* in the bottom 30*b* of the top enclosure.

Conduit 28 preferably extends through the aperture 30*e* and through the top 40*a* of bottom enclosure 40. This conduit extends generally downward to the inlet of a shut off valve 46. In some embodiments the shut off valve 46 includes both a stationery member 46*a* receiving water from conduit 28, and a pivoting member 46*b* having an outlet that provides water to a swing down arm 44. In some embodiments, shut off valve pivoting member 46*b* pivots between a shut off position when arm 44 extends upward (as shown in FIG. 3), to an open position when the arm is swung forward (as shown in FIG. 2). However, the present invention also contemplates any type of shut off valve that permits the downward pivoting motion of arm 44, including as one example a 2-position solenoid shut off valve having one or more flexible connections to either arm 44 or conduit 28 that permit relative pivotal motion.

In some embodiments, the enclosed volume that includes the eyewash assembly X42 further includes a temporary reservoir for drained water in the bottom X40*b*. As will be discussed, this bottom reservoir temporarily traps water draining from tray X41, and stores it before it exits drain 48.

Figure 5:
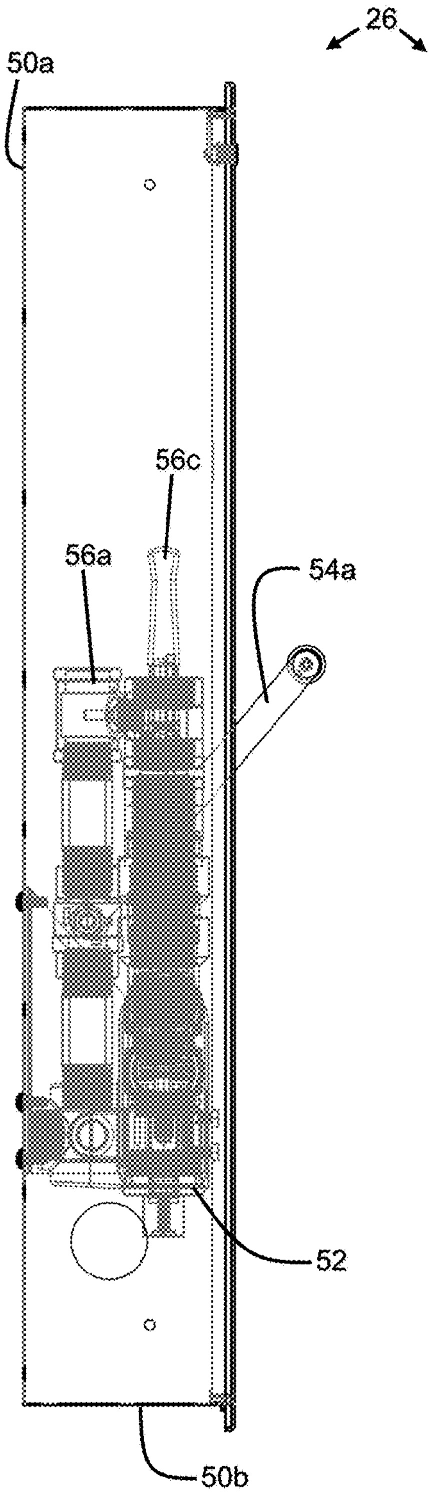
FIG. 5 is a side elevational view of the apparatus of FIG. 4, shown orthogonally.
Figure 4:
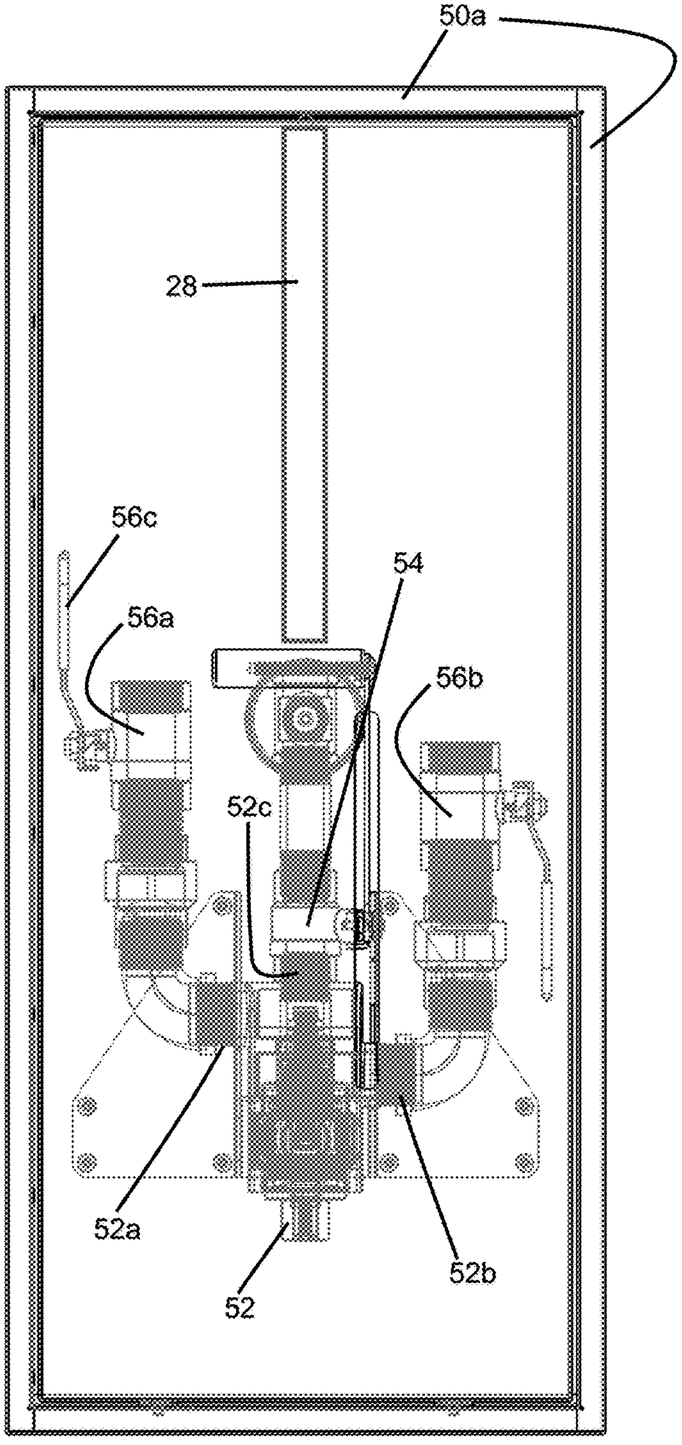
FIG. 4 is a front elevational view of a portion of the apparatus of FIG. 2, with the door removed.

FIGS. 4 and 5 present front and side views, respectively, of an adjacent side-located enclosed shower cabinet 26 according to one embodiment of the present invention. Preferably, cabinet 26 includes a single enclosure 50 located adjacent to an eyewash cabinet 22, as shown in FIG. 1, although in yet other embodiments the present invention contemplates multiple enclosures for the shower cabinet, including those in which one of the enclosures is lockable (such as the one including the thermostatically controlled valve) and in which other equipment used in an emergency (such as the shower or other ancillary equipment) is in an unlocked enclosure.

FIG. 4 shows an enclosure 50 having a plurality of sides 50*a*, a bottom 50*b*, and a lockable door 50*c* (shown in FIG. 1) that create a lockable internal volume that protects within it a thermostatically controlled mixing valve 52 that provides water by a conduit 28 to an emergency shower (not shown). Conduit 28 receives tempered water from an outlet of a shut off valve 54, the water flowing out of valve 54 being from an outlet 52*c* of a thermostatically controlled valve 52, which provides a thermostatically controlled mixture of hotter water from inlet 52*a* and colder water from inlet 52*b*. In some embodiments, these mixing valve inlets are provided hot and cold water, respectively, from manual shut off valves 56*a* and 56*b*, respectively. Each shut off valve has a corresponding lever arm 56*c* by which the valve can be opened or closed. The shut off valves and their lever arms are adapted and configured in some embodiments such that when both inlet valves 56*a* and 56*b* are open that the lever arms 56*c* preferably reside within the enclosure. When the valves are moved to the shut off position, the lever arm extends forward, such that the door 50*c* cannot be closed. However, in yet other embodiments the lever arms 56*c* can extend through apertures (not shown) in door 50*c* so as to be actuatable to a shut off position even when the door is locked, in a manner as will be described for the lever arm 54*a* of shut off valve 54.

Figure 6:
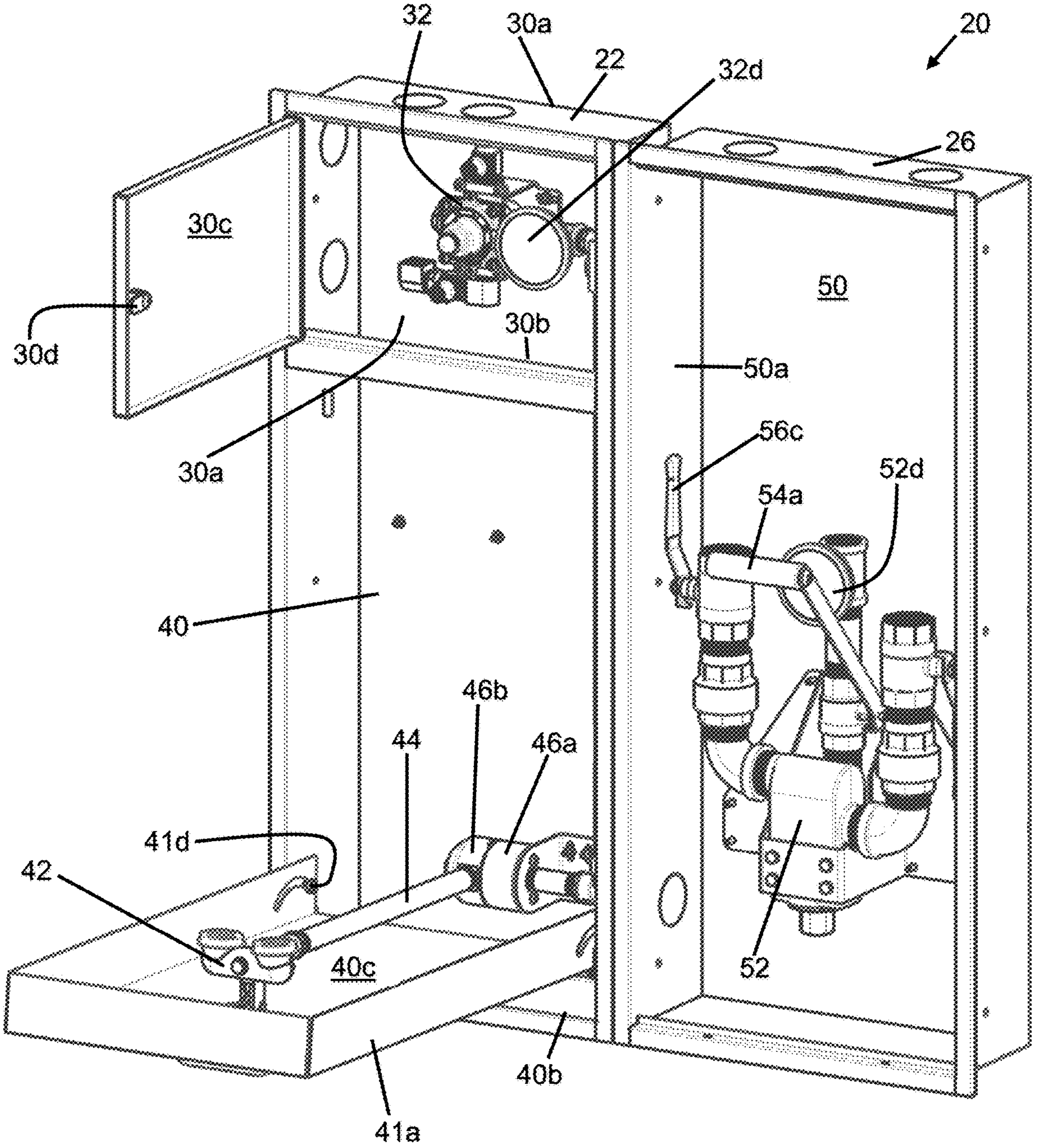
FIG. 6 is a front, top, opposite side perspective line drawing of the apparatus of FIG. 2.
Figure 9:
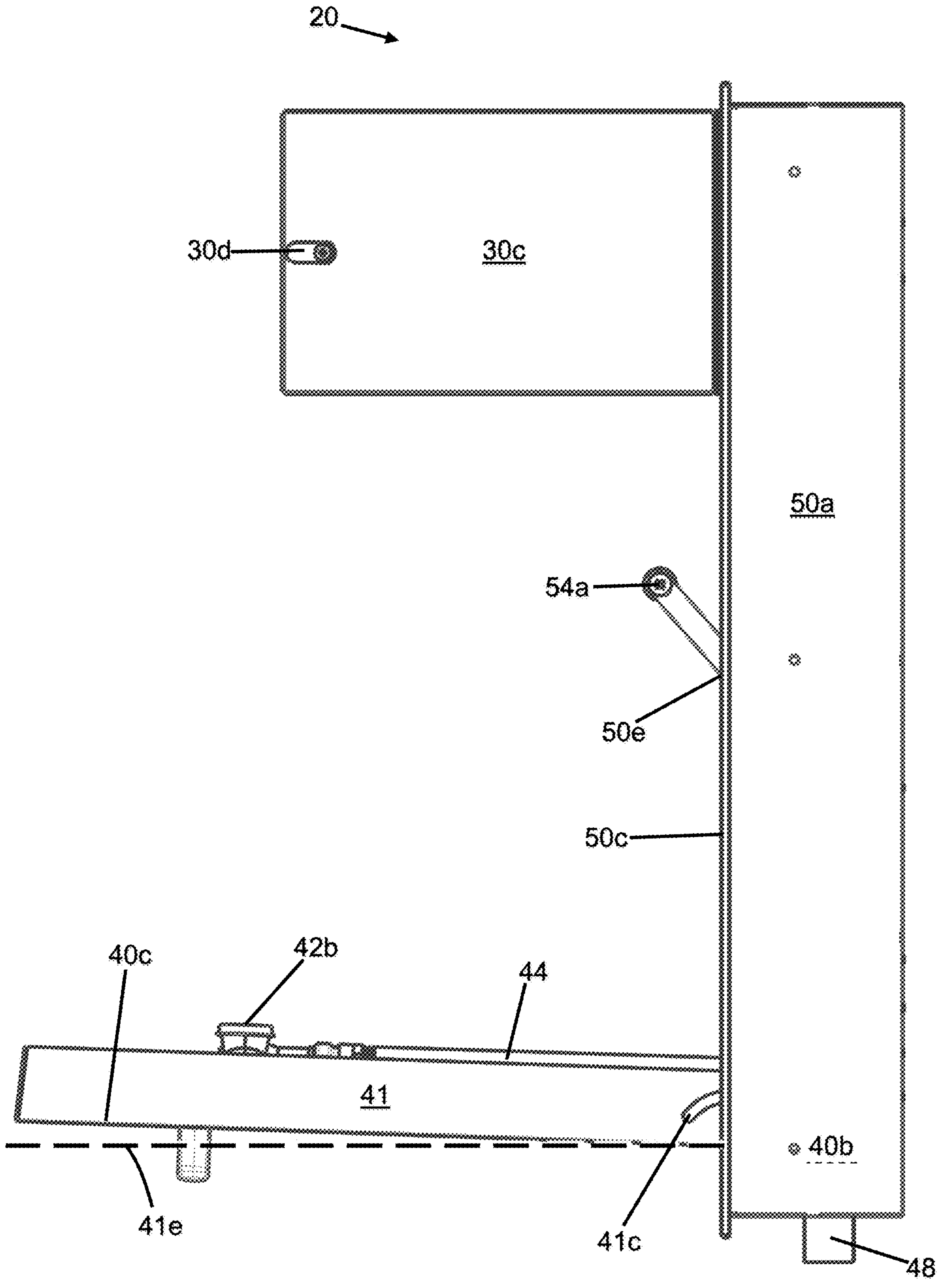
FIG. 9 is a side elevational view of the apparatus of FIG. 7, as taken along line 9-9.

Referring to FIG. 6, bottom enclosure 40 is shown in an actuated or deployed position, with tray 41 being pivoted forward and downward. Tray 41 includes cover 40*c* as a bottom, and is surrounded on three sides by tray side members 41*a*. Eyewash assembly 42 is preferably coupled to doors 40*c* of tray 41, and also connected to pull down arm 44, such that pivoting motion of tray 41 results in actuation of shut off valve 46 to the open configuration. In this configuration, tempered water is released in an upward spray pattern from left and right eyewashes 42*a* and 42*b*, respectively. This open configuration is also seen in FIG. 9.

Drainage basin 41 is adapted and configured to collect within its sides 41*a* the tempered water that has sprayed out of eyewashes 42*a* and 42*b*. The pivoting motion of basin 41 is guided by a track or slot 41*c*, the position of which is retained by a pin 41*d* of side 40*a* (as best seen in FIG. 6). Referring again to FIG. 9, the coaction of slot 41*c* and pin 41*d* results in the door 40*c* (which is also the bottom of tray 41) being located at a slight upward elevational angle 41*e*, as indicated between the horizontal dotted line of FIG. 9 and the bottom 40*c*. Because of this elevational angle, water within basin 41 flows toward the right (in FIG. 9) to the bottom 40*b* collection chamber, and from this bottom collection chamber 40*b* of enclosure 40 out through a drain 48. Although FIGS. 6 and 9 show door 30*c* in the open configuration, it is understood that this door is shown open simply for purposes of clarity and explanation of the particular embodiments, and that in everyday use the lock 30*d* remains locked against the side of the enclosure so as to prevent unauthorized adjustment of mixing valve 32. However, note that door 40*c* is preferably not lockable.

Figure 7:
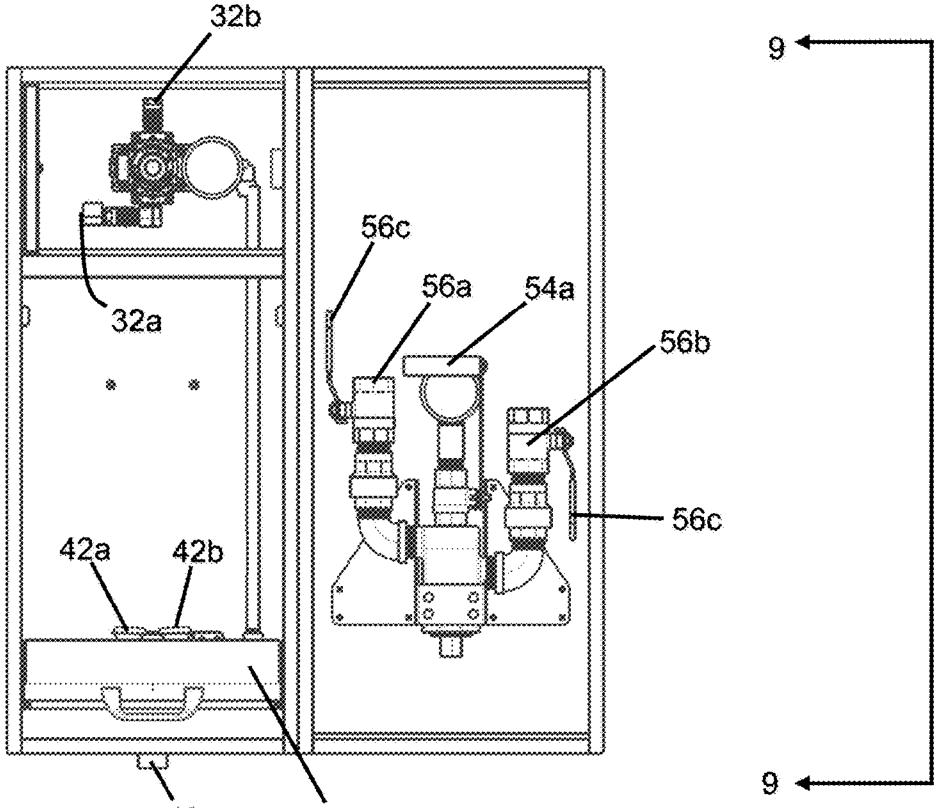
FIG. 7 is a front elevational view of the apparatus of FIG. 6.
Figure 8:
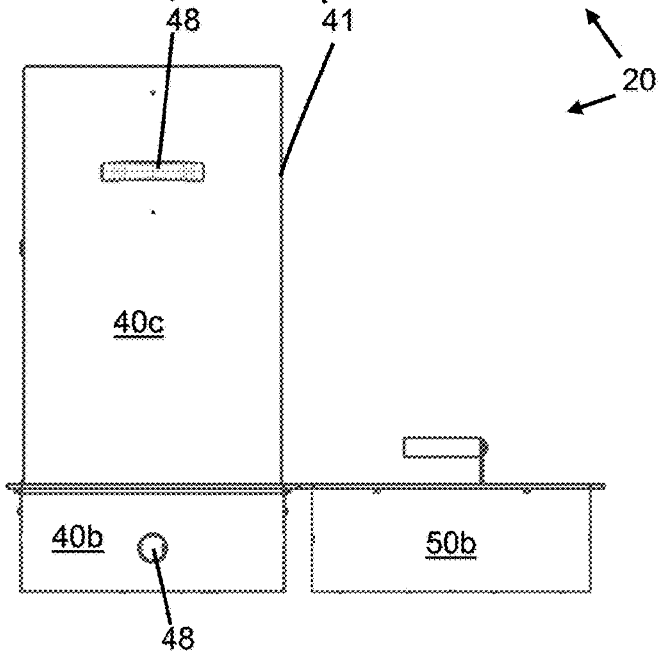
FIG. 8 is a bottom end view of the apparatus of FIG. 7, shown orthogonally.

Preferably, door 50*c* of the shower cabinet 26 includes a lock 50*d* to likewise prevent unauthorized adjustment of mixing valve 52 or unauthorized actuation of shut off valves 56. If a user needs to actuate flow to the emergency shower, this flow can be actuated with the door locked by pulling forward and down on lever arm 54*a*. As best seen in FIGS. 1 and 9, handle 54*a* is attached to a lever arm that extends through a slot 50*e* in door 50*c*. This lever arm is further attached to shut off valve 54 receiving tempered water from the outlet 52*c*. Referring to FIGS. 2 and 7, the individual shut off valve levers 56*c* are shown in the open position, such that the levers preferably fit within the locked interior enclosed volume of enclosure 50.

Figure 10:
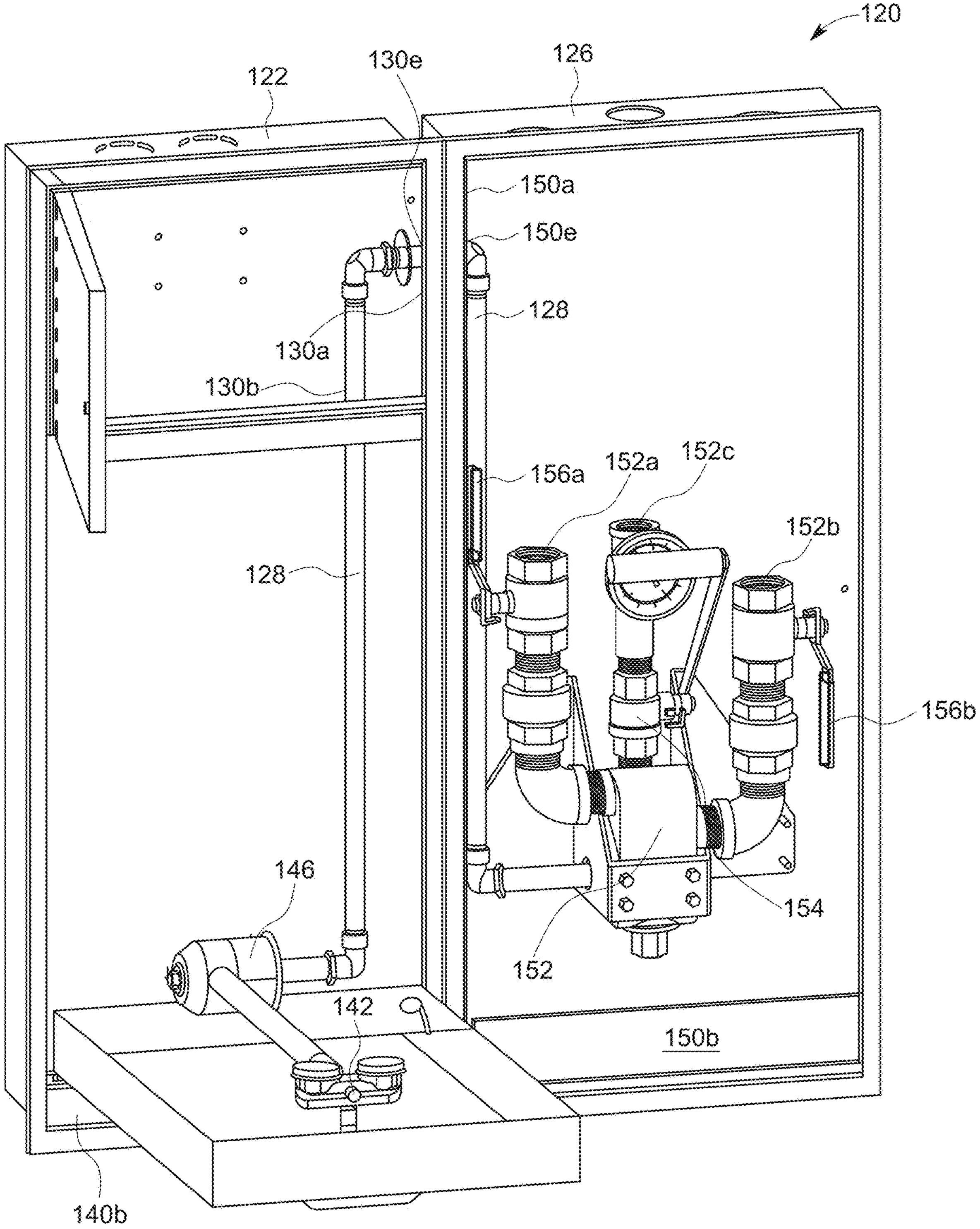
FIG. 10 is a front, top, side perspective photographic rendering of an apparatus according to another embodiment of the present invention.
Figure 11:
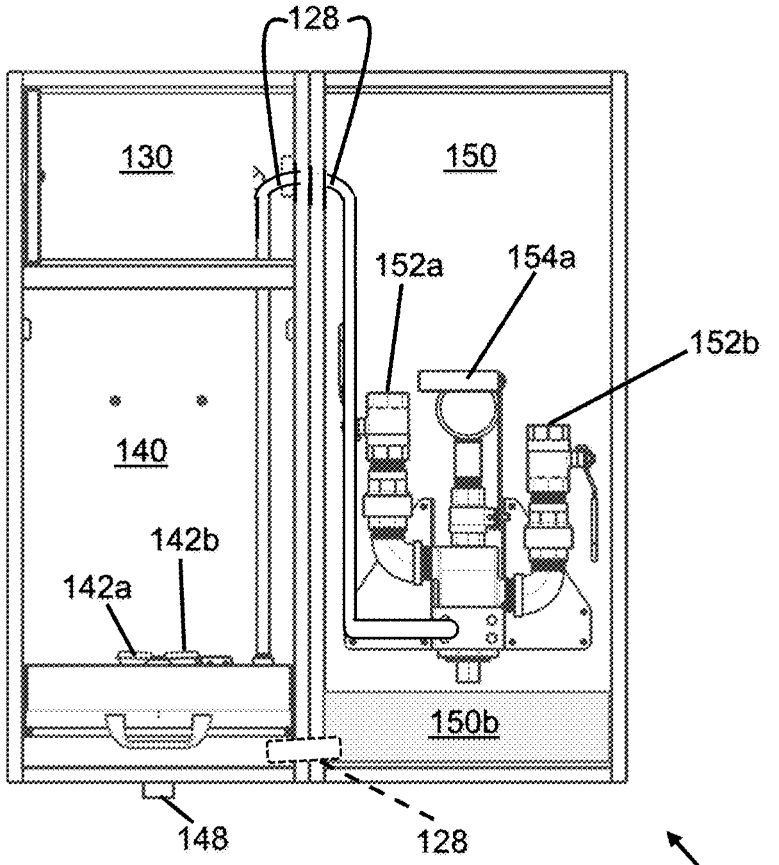
FIG. 11 is a front elevational view of the apparatus of FIG. 10.
Figure 12:
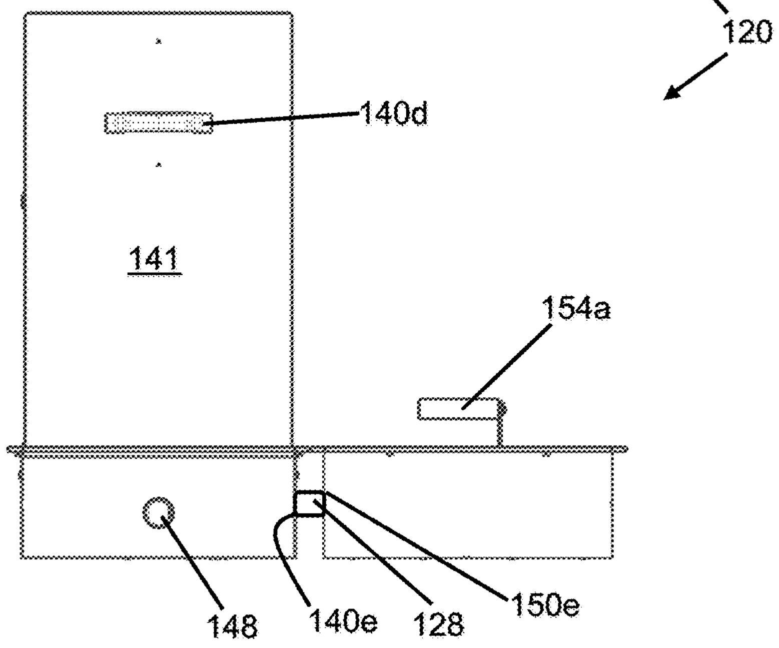
FIG. 12 is a bottom end elevational view of the apparatus of FIG. 11, shown orthogonally.

FIGS. 10-12 depict various views of an emergency wash system 120 according to another embodiment of the present invention. Eyewash system 120 includes in some embodiments top and bottom enclosures 130 and 140, respectively, and an adjacent enclosure 150. System 120 differs in at least one aspect from system 20 by the use of a single thermostatically controlled valve 152 that provides tempered water to both the eyewash assembly 142 and to a shower nozzle (not shown). Although FIGS. 10 and 11 show three enclosures 130, 140, and 150, it is understood that in yet other embodiments the present invention also contemplates a pair of adjacent enclosures 140 and 150.

Emergency wash system 120 includes enclosure 140 substantially the same as enclosure 40 previously discussed. Preferably, the doors X40*c* are non-locking, such that the drainage basin X41 can always be tilted forward and downward for access to the eyewash assembly X42.

Enclosure 150 preferably includes a door 150*c* having a lock 150*d* (neither shown in FIGS. 10-12), such that the door can remain locked to prevent unauthorized access to thermostatically controlled mixing valve 152. As best seen in FIGS. 10 and 11, mixed water from outlet 152*c* enters a conduit 128 that ultimately provides mixed water to the inlet of shut off valve 154. As shown in FIG. 10, in some embodiments this conduit 128 extends first into a lockable enclosure 130, with conduit 128 extending through an aperture 150*e* in a side 150*a*, and likewise through an aligned aperture 130 in the adjacent side 130*a*. This conduit then extends downward through the bottom 130*b* and into the bottom enclosure 140. However, in yet other embodiments the conduit 128 from the outlet 152*c* extends directly into enclosure 140.

As shown in FIGS. 11 and 12, a handle 154*a* for shut off valve 154 extends through an aperture in cover 150*c*. As in system 20 previously described, the manual actuation of handle X54*a* results in the supply of mixed or tempered water from the outlet 152*c* into a shower. Also as shown for system 20, door 140*c* includes a handle 140*d* that can be used to pivot tray 141 to an open configuration. Water exiting eyewash nozzles 142*a* and 142*b* is substantially captured in basin 141, which then drains into the bottom 140*b*, and out through drain 148. Similar to system 20, enclosure 40 includes a bottom portion X40*b* that is adapted and configured to temporarily store water exiting from the back of tray 141, and funneling that water to drain 148.

System 120 further includes a bottom 150*b* that is adapted and configured to temporarily contain any water resulting from flushing operations (such as for decontamination events), and also water that leaks from valves 152, 154, or 156. Water within this bottom compartment 150*b* is in fluid communication with the bottom water-containing compartment 140*b* by way of a conduit 128, best seen in FIGS. 11 and 12. Thus, any water collected within either of the compartments 140*b* or 150*b* is readily provided to drain 148. In yet other embodiments, it is further contemplated that the drain 148 could also be located in the bottom of compartment 150*b*, with the interconnecting conduit 128 providing fluid communication from compartment 140*b* into compartment 150. Further, it is understood that each compartment X40*b* and X50*b* can each have their own drain X48.

Figure 13:
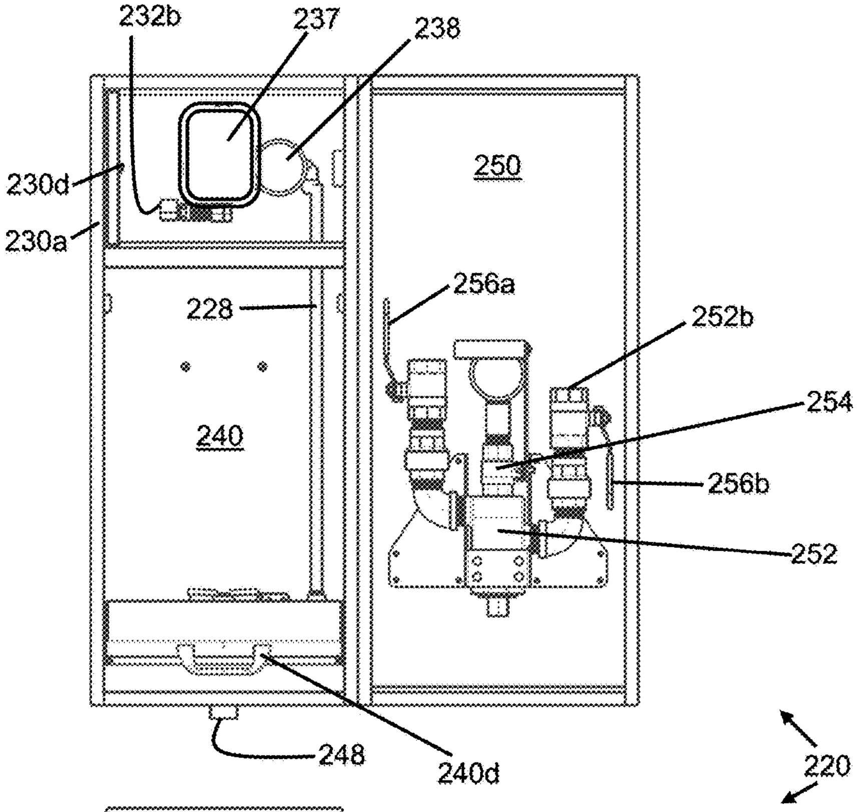
FIG. 13 is a front elevational view of an apparatus according to another embodiment of the present invention.
Figure 14:
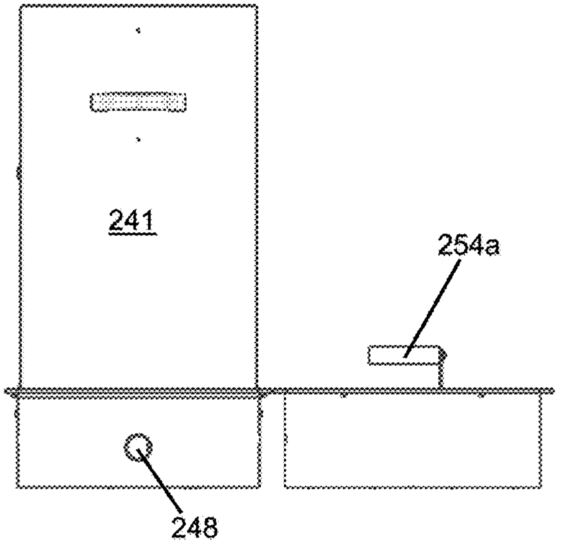
FIG. 14 is a bottom end elevational view of the apparatus of FIG. 13, shown orthogonally.

FIGS. 13 and 14 depict views of an emergency wash system 220 according to another embodiment of the present invention. System 220 includes enclosures 240 and 250 having features substantially the same as those of enclosures X40 or X50, as previously discussed.

System 220 includes a top enclosure 230 having a door 230*c* with a lock 230*d* to discourage unauthorized handling of the components within the interior. Protected within this lockable interior is an electric heater 237 having an inlet 232*d* through which it receives water. Heater 237 can heat water upon demand, and provide it to an electrically actuatable shut off valve 238, from which water is provided to a conduit 228 and ultimately to a shut off valve 246 and an eye assembly 242. However, in yet other embodiments heated water exiting the outlet of heater 237 is provided directly to conduit 228.

Operation of electric water heater 237 is by way of a combination of manual operation and/or electrical operation using one or more sensors or switches. As one example, the manual pull down of handle 240*d* preferably changes pivoting shut off valve 246 from a closed configuration to an open configuration, in which water is free to flow from eyewash assembly 242. In those embodiments including an actuatable shut off valve 238, the movement of cover 240*d* can also change the state of an electrical switch and/or relay that changes valve 238 to an opened configuration, allowing the flow of water through heater 237. However, in those embodiments that do not include a shut off valve 238, the pivoting movement of door 240*b* is sufficient to initiate the flow of water through heater 237.

In some embodiments, an electrical switch and/or relay are activated by movement of handle 240*d*, such that moving the door away from the closed position results in the provision of electrical power to heater 237. The opening of shut off valve X46 results in either a drop in pressure in conduit X28, or an increase in flow through the conduit. However, in yet other embodiments a pressure switch or flow meter located between the outlet of heater 237 and the inlet to shut off valve X46 results in an electrical signal that can turn on power to heater 237 (such as by way of a relay, with or without a computer control).

Figure 15:
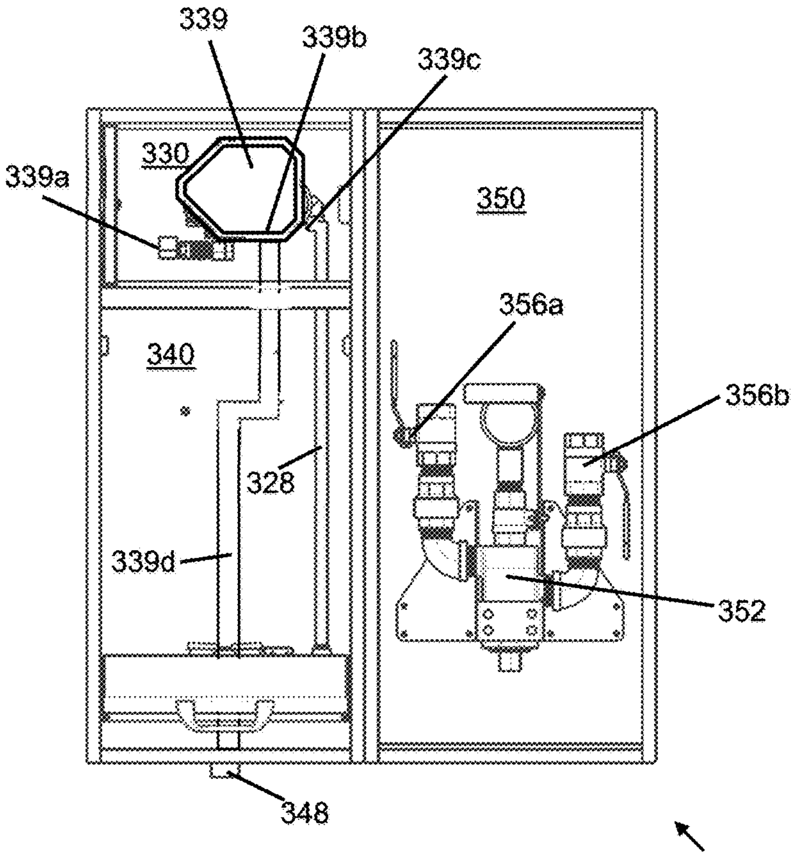
FIG. 15 is a front elevational view of an apparatus according to another embodiment of the present invention
Figure 16:
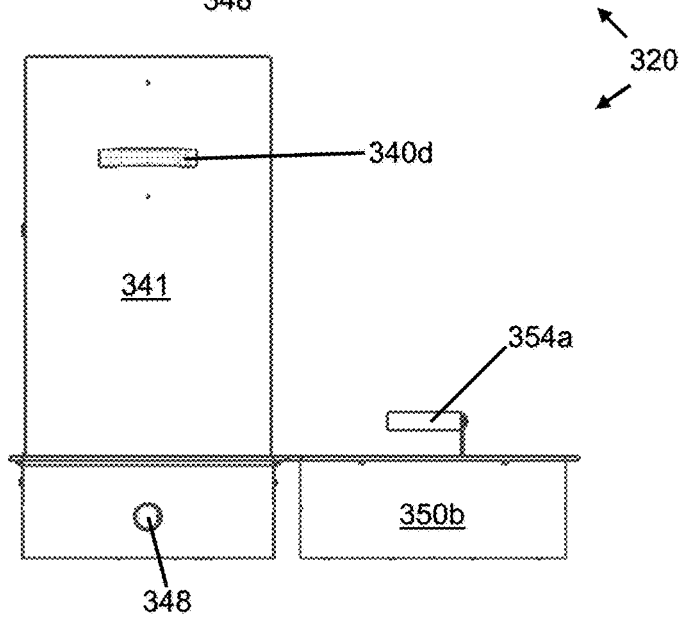
FIG. 16 is a bottom end elevational view of the apparatus of FIG. 15, shown orthogonally.

FIGS. 15 and 16 depict various views of an emergency washing system 320 according to another embodiment of the present invention. Emergency washing system 230 includes first and second enclosures 330 and 340 that include several of the features previously discussed for enclosures X30 and X40, except for the differences that will now be described. With regards to enclosure 350, it includes one or more of the features disclosed herein for any of the adjacent enclosures X50.

Referring to FIG. 15, it can be seen that top enclosure 330 preferably includes a multi-position, single inlet, dual outlet valve 339. Inlet 339*a* receives warm water, such as tempered water from a thermostatically controlled mixing valve (not shown) or from an electrical water heater (not shown). This warm water is directed in a first valve position to flow to a warm or tempered outlet 339*c* that is then provided by way of conduit 328 to a shut off valve X46 and eyewash assembly X42, as previously described.

Valve 339 can be actuated, either manually or electrically, to a second position in which water from inlet 339*a* is provided to a flushing conduit 339*d* that is in fluid communication with drain 348. By placing valve 339 in this second position, at least a portion of the outlet flow bypasses conduit 328 and eyewash assembly 342. In some embodiments, eyewash assembly 342 includes a flow limiting valve (not shown) that regulates the outlet flow of the eyewash assembly to a range of relatively low flow rates. The flow limiting valve achieves this by restricting the internal flow characteristics by way of a variable orifice, as one example. However, when valve 339 is placed in the second position, the eyewash assembly X42 and this flow limiting valve is bypassed, and a much higher flushing flow can be achieved through conduit 339*d*. This higher flushing flow is advantageous when treating the flowpath upstream of valve 339 to remove harmful bacteria. By having a higher flow rate, this flushing decontamination operation happens more quickly and thoroughly.

Figure 17:
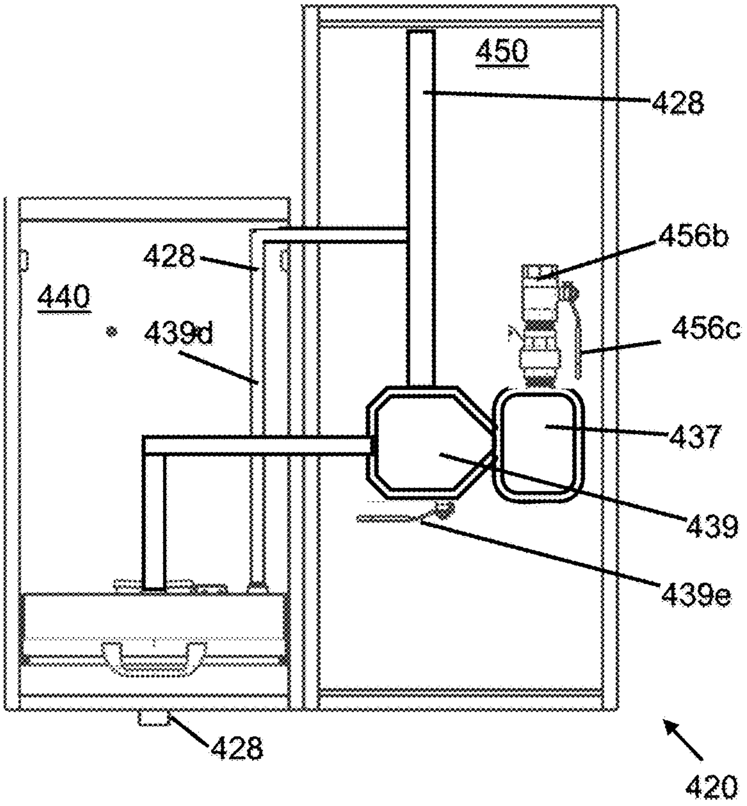
FIG. 17 is a front elevational view of an apparatus according to another embodiment of the present invention.
Figure 18:
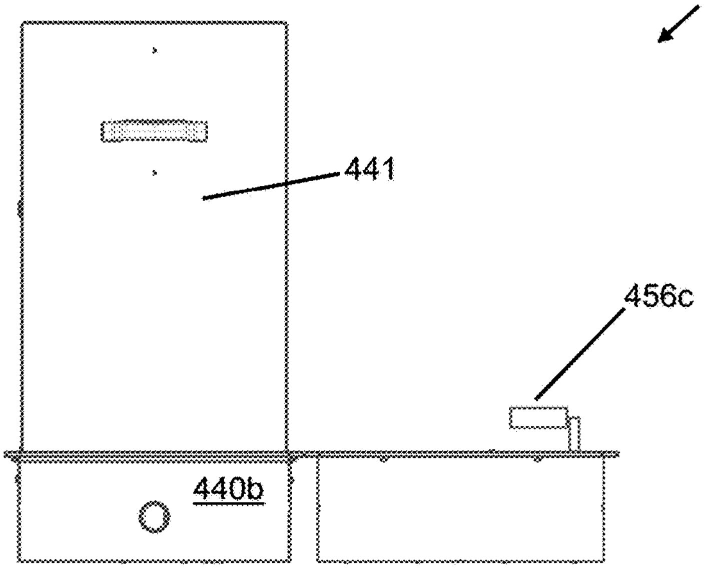
FIG. 18 is a bottom end elevational view of the apparatus of FIG. 17, shown orthogonally.

FIGS. 17 and 18 depict different views of an emergency washing system 420 according to another embodiment of the present invention. System 420 combines different aspects of systems 220 and 320 as previously discussed.

System 420 includes a single emergency eyewash enclosure 440 that is adjacent to an emergency shower enclosure 450. Enclosure 440 includes a cover 440*c* that also acts as a drainage basin 441, providing water to a bottom compartment 440*b*, which includes a drain exit 428. As previously discussed, the forward pivoting of tray 441, such as by pulling down on the handle, results in the flow of water from a supply conduit 428 to a shut off valve, and ultimately out of an eyewash nozzle 442*a* and 442*b*.

Tempered water to conduit 428 is provided by a heater 437 located in enclosure 450. Heater 437 receives water through an inlet and shut off valve 456*b*. Heater 437 elevates the temperature of the water to an acceptable range of temperatures, and provides the tempered water upward (referring to the orientation of FIG. 17), where the tempered water splits and is provided both to a shower (not shown) and also to conduit 428 that leads to the eyewash assembly 442.

This tempered water preferably exits a multi-position valve 439 having an inlet that receives tempered temperature water from heater 437. Valve 439 further includes a lever 439*e*, through which the outlet of valve 439 can be made to pass into flushing conduit 439*d*. As discussed previously, in this flushing mode any flow limiter within eyewash assembly 442 is bypassed, thus permitting a higher rate of flushing flow as compared to emergency flow. Although valve 439 is shown with a manual lever 439*e* for activation to the flushing position, it is understood that such activation can also be by means of a combination of electrical switches and/or electrical sensors.

Referring to FIG. 18, it can be seen that lever 456*c* for inlet shut off valve 456*b* extends outward through a slot in the lockable cover 450*c* (not shown). In a manner similar to that of pull down arm X54*a* of shut off valve X54, a user can activate preferably both the eyewash emergency flow as well as the shower emergency flow with a single lever.

Figure 19:
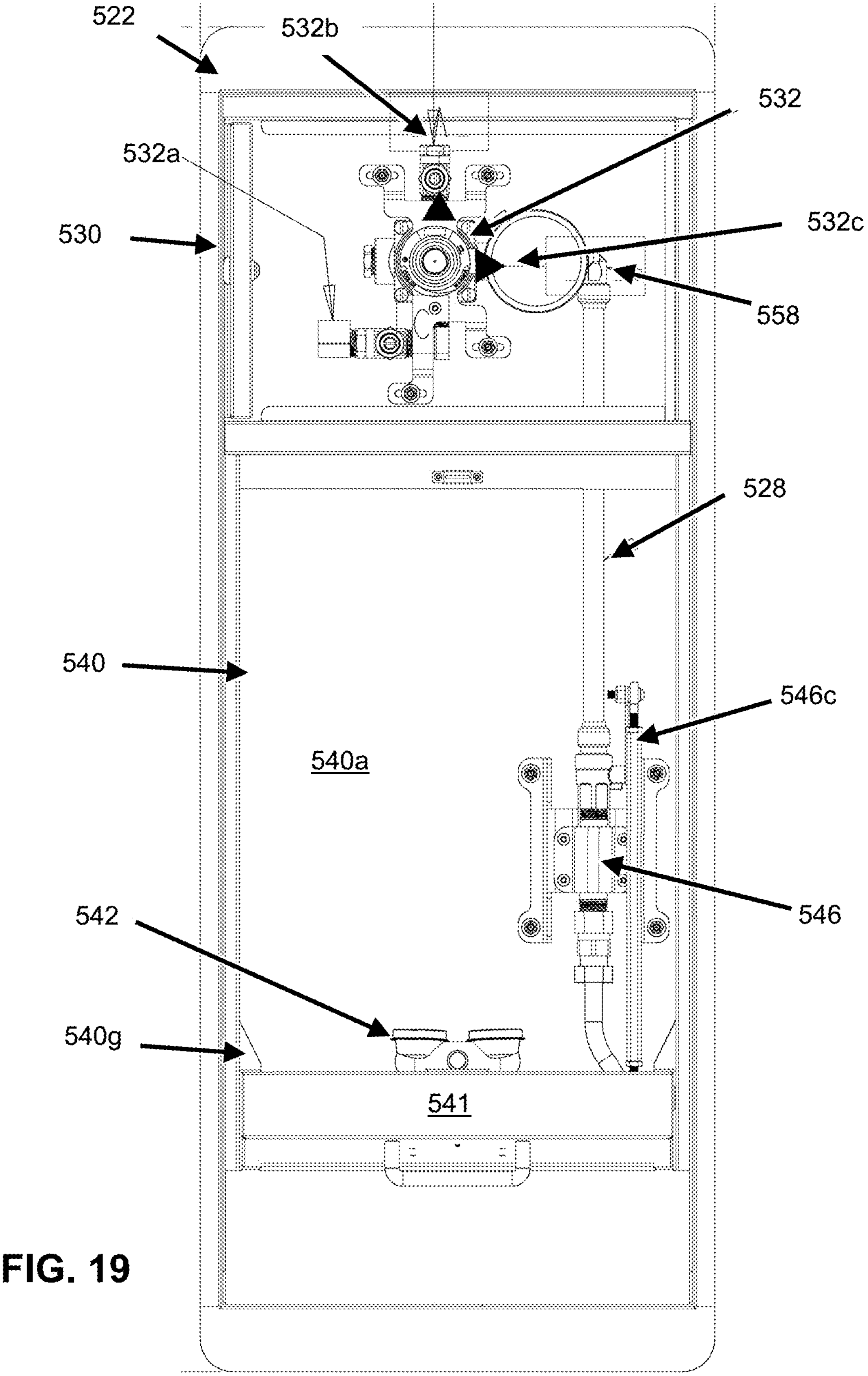
FIG. 19 is a frontal planar line drawing of an emergency eyewash cabinet according to another embodiment of the present invention.
Figure 20:
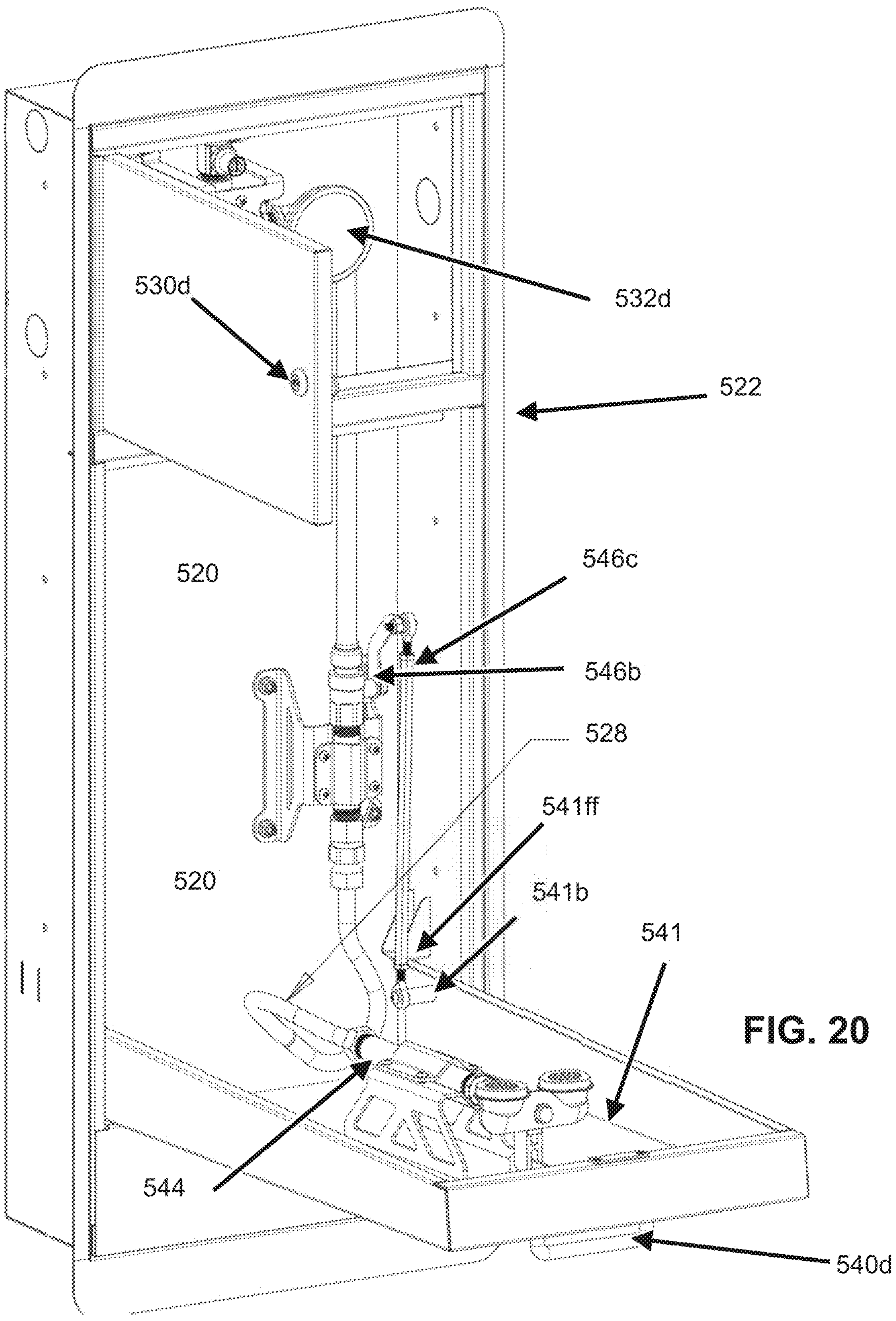
FIG. 20 is a front, top, side perspective representation of the apparatus of FIG. 19.
Figure 21:
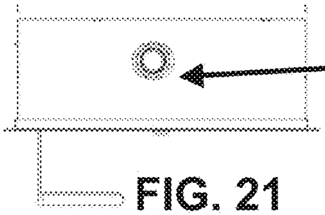
FIG. 21 is a top plan orthogonal view of the apparatus of FIG. 22.

FIGS. 19 and 20 depict an enclosed eyewash cabinet 522 according to another embodiment of the present invention. Apparatus 522 is similar to the various cabinets X22 described herein, except for the differences which will now be discussed.

Top enclosure 530 is similar to some of the embodiments previously described, having a thermostatically controlled mixing valve 532 that receives hot and cold water, and provides mixed water to an outlet. Preferably, enclosures 530 have a door 530*c* that includes a lock 530*d* so as to maintain valve 532 such that tempering with the valve is minimized. Enclosure 530 further includes a conduit 528 that extends through an aperture in the bottom of enclosure 530 and the top of enclosure 540, these aligned apertures also permitting drainage of any leakage within enclosure 530 into the enclosure beneath it, enclosure 540.

Enclosure 540 is preferably, but not necessarily, placed beneath an enclosure including a thermostatically controlled valve. As shown, mixed temperature water from conduit 528 is received into the inlet of a shutoff valve 546. Shutoff valve 546 can be of any type, but in one embodiment it includes stationary and pivoting members, with the relative position of these members achieving either an open state for the shut off valve, or a closed state for the shut off valve. In the embodiment shown, a pivoting or movable member of valve 546 is attached to a linkage 546*c* that extends downward and pivotally couples to the drainage tray 540*d*. Linkage 546*c* and the attachments points of the linkage to the pivoting member 546*b* and the linkage attachment pivot joint 541*f* are adapted and configured such that the opening of door 540*d* (shown as downward pivoting, although other types of motion are contemplated) result in the linkage 546*c* moving pivoting member 546*b* from a position of shut off (i.e., no flow or greatly reduced flow) to an open position that permits the transfer of the mixed water to inlet 544*a* of the eyewash assembly 542. When the door is opened for emergency usage, the bottom drainage tray is preferably elevated about eight degree from the horizontal in a direction to send flow toward the drain. Door stops 540*g* on either side of the enclosure limit the pivotal movement of the door.

The connection between the outlet of the shutoff valve and the inlet of the eyewash assembly preferable includes one or more swiveling joints. The conduit between shutoff valve inlet and eyewash outlet is preferably a flexible conduit, such as those made with stainless steel braid. With this actuation of the shutoff valve 546, mixed temperature water is provided to the upwardly directed eyewash nozzles as soon as door 546*d* is actuated toward the open position.

Also shown in FIG. 19 is an optional flushing valve 558. This single inlet, dual outlet valve receives tempered water from valve 532. One inlet is directed into conduit 528. The other outlet is available for connection to a flushing conduit (not shown). When used for flushing, valve 558 permits a higher flow of water through the flushing conduit than the restricted flow of the eyewash assembly (such as in those eyewash assemblies including flow limited valves). Valve 558 can include a manually movable internal element to permit a maintenance worker to switch between outlets. alternatively, the flushing outlet can be capped when not in use.

FIGS. 21-25 depict various features of an enclosed shower cabinet 626 according to another embodiment of the present invention. The system within cabinet 626 is similar to the systems of the other cabinets X26 shown herein, except for the differences that will now be described.

Figure 22:
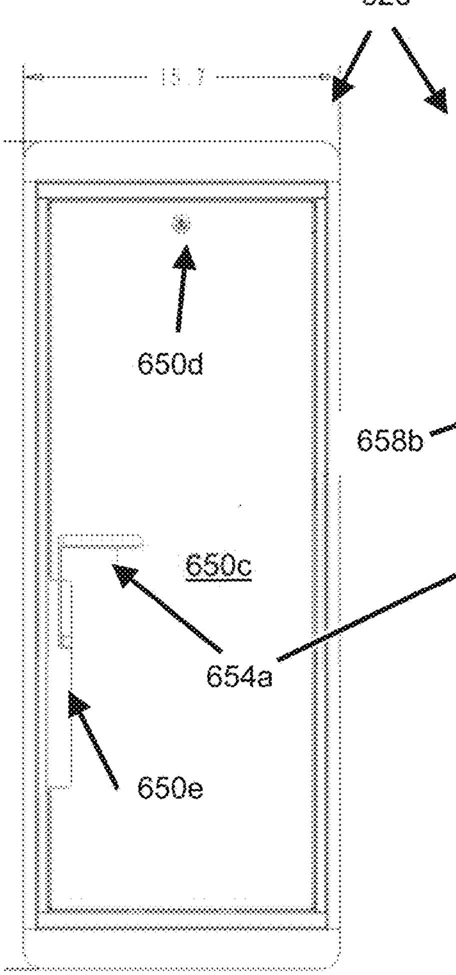
FIG. 22 is a frontal planar view of an emergency washing cabinet according to another embodiment of the present invention.
Figure 23:
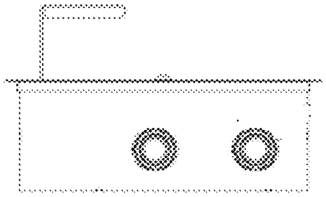
FIG. 23 is a bottom orthogonal view of the apparatus of FIG. 22.

Referring to FIG. 22, it can be seen that cabinet 626 preferable includes a door 650*c* that includes a lock 650*d* intended to discourage tampering. Further, an actuation handle 654*a* extends through a slot 650*e* in the door, handle 654*a* being useful as previously described to actuate the system within enclosure 650 to provide water to a shower (not shown).

Figure 24:
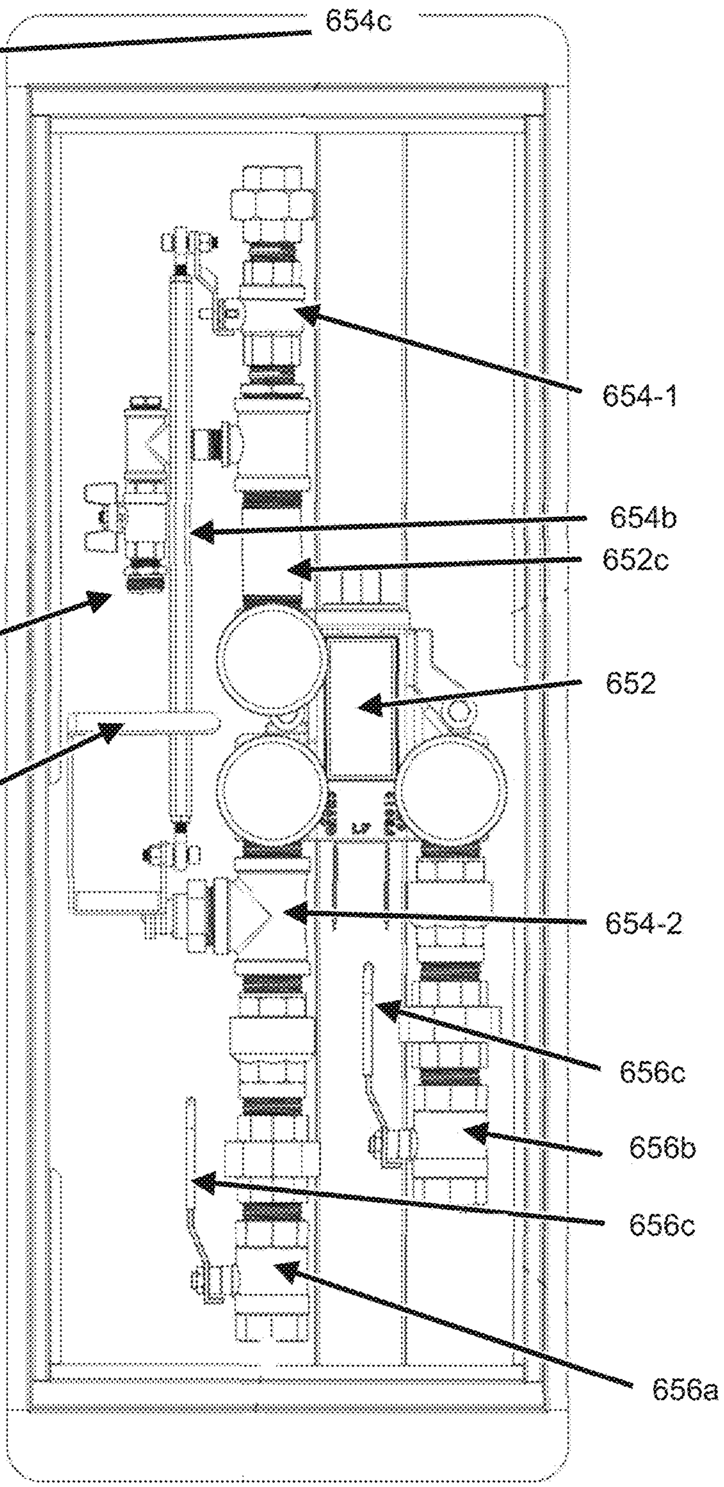
FIG. 24 is an enlarged view of the apparatus of FIG. 22, with the front cover removed.
Figure 25:
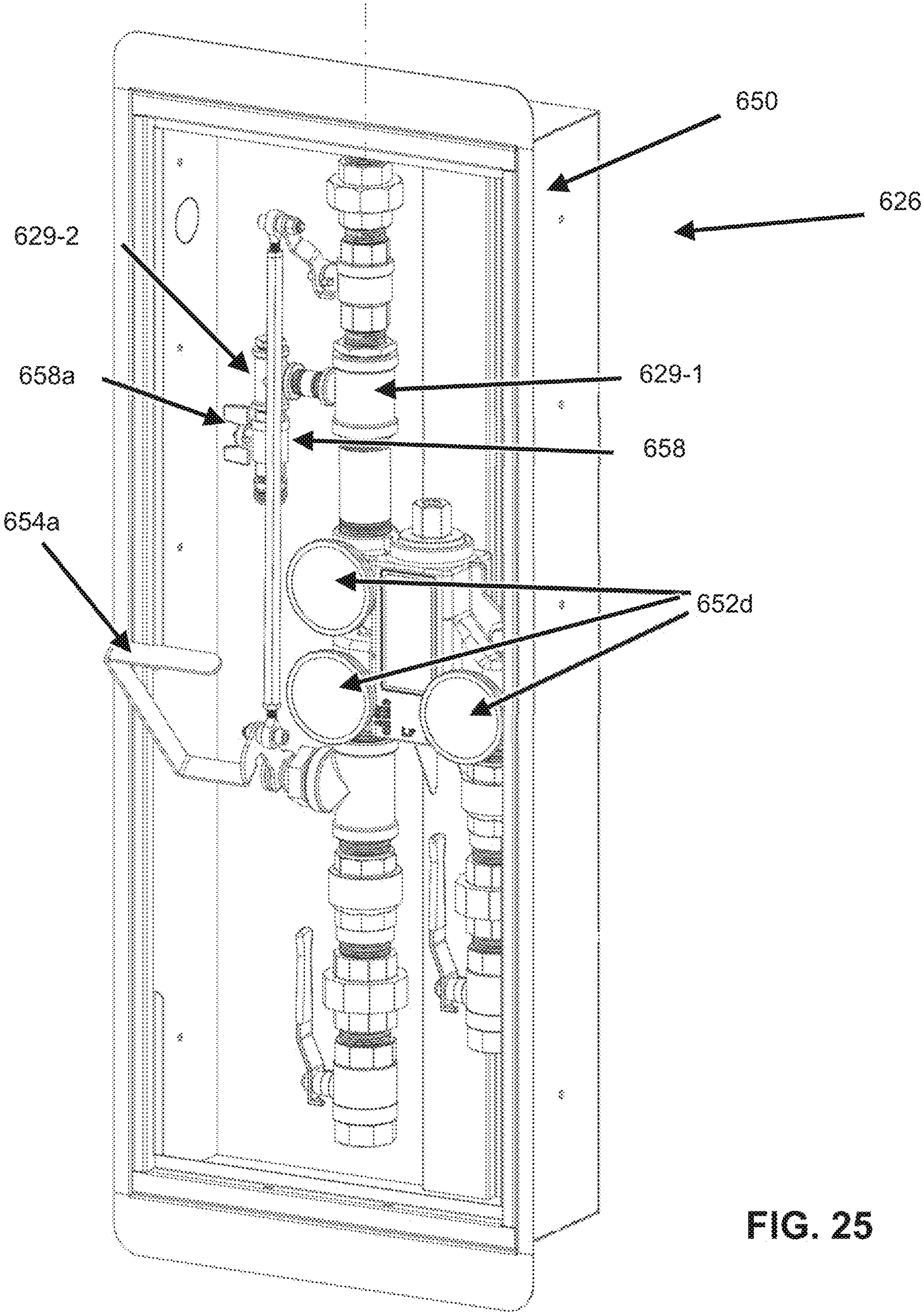
FIG. 25 is a front, top, side perspective representation of the apparatus of FIG. 24.

FIGS. 24 and 25 show enclosure 650 with door 650*c* removed. A thermostatically controlled mixing valve 652 is located within the enclosure, and receives flows of hot water and cold water and provides mixed water at a predetermined intermediate temperature. It is understood that the thermostatic control of the mixing valves X52 can be accomplished in any manner, including by way of thermostatically expanding and contracting elements and electrical actuation, by way of example. Hot and cold water are provided by inlet shut off valves 656*a* and 656*b*, respectively. Each of these valves include a lever 656*c* that can be used to shut off that particular flow of water. Referring to FIG. 25, it is understood that such actuation and operation of the lever in some embodiments results in the levers 656*c* being moved outward to a position that would prevent subsequent closure of the door 650*c*.

The outlet of shut off valve 656*a* is provided to a second shut off valve 654-2. The outlet of shut off valve 654-2 is provided to the hot inlet of thermostatically controlled valve 652. The tempered water exiting the outlet 652*c* is preferably provided to a pair of single inlet dual outlet unions 629-1 and 629-2. One outlet of union 629-1 is provided to the inlet of a shower shut off valve 654-1. The outlet from valve 654-1 is in some embodiments provided to an external, downwardly aimed shower nozzle (not shown). The other outlet of union 629-1 is provided to the inlet of union 629-2. As discussed herein, various references are made to conduits X28 and unions X29, but it is understood that plumbing installation experts are extremely creative, and can provide the functionally same flowpath as described, but with many different types of devices.

Referring to FIG. 24, it can be seen that the actuating arms of shut off valves 654-2 and 654-1 are operable connected by an actuating linkage 654*b*. The interconnections in some embodiments include ball joints or other pivotal joints to minimize any binding of the linkage. The movement of handle 654*a* from a closed or shut off position to an open or deployed position results in movement of linkage 654*b* to simultaneously open both shut off valves 654-2 and 654-1, or to close both shut off valves 654-2 and 654-1.

As best seen in FIG. 24, union 629-2 includes a first outlet (shown on top) that can be capped, or can be used to provide mixed temperature water to another emergency usage device. In addition, union 629-2 directs its other outlet (shown downward) to a flushing valve 658 that can be used to provide a high flow rate flush for the various flowpaths within enclosure 650. Flushing valve 658 includes an outlet 658*b* (in some embodiments useful with a flexible hose), such that the outlet of the flushing water can be directed to a nearby drain. A knob provides for actuation of flushing valve 658 from an open position permitting the flow of water to a drain, or to a shut off position, in which flushing water is not received at outlet 658*b*. Note that in some embodiments the first (top) outlet of union 629-2 is not affected by actuation of flushing valve 658.

Figure 26:
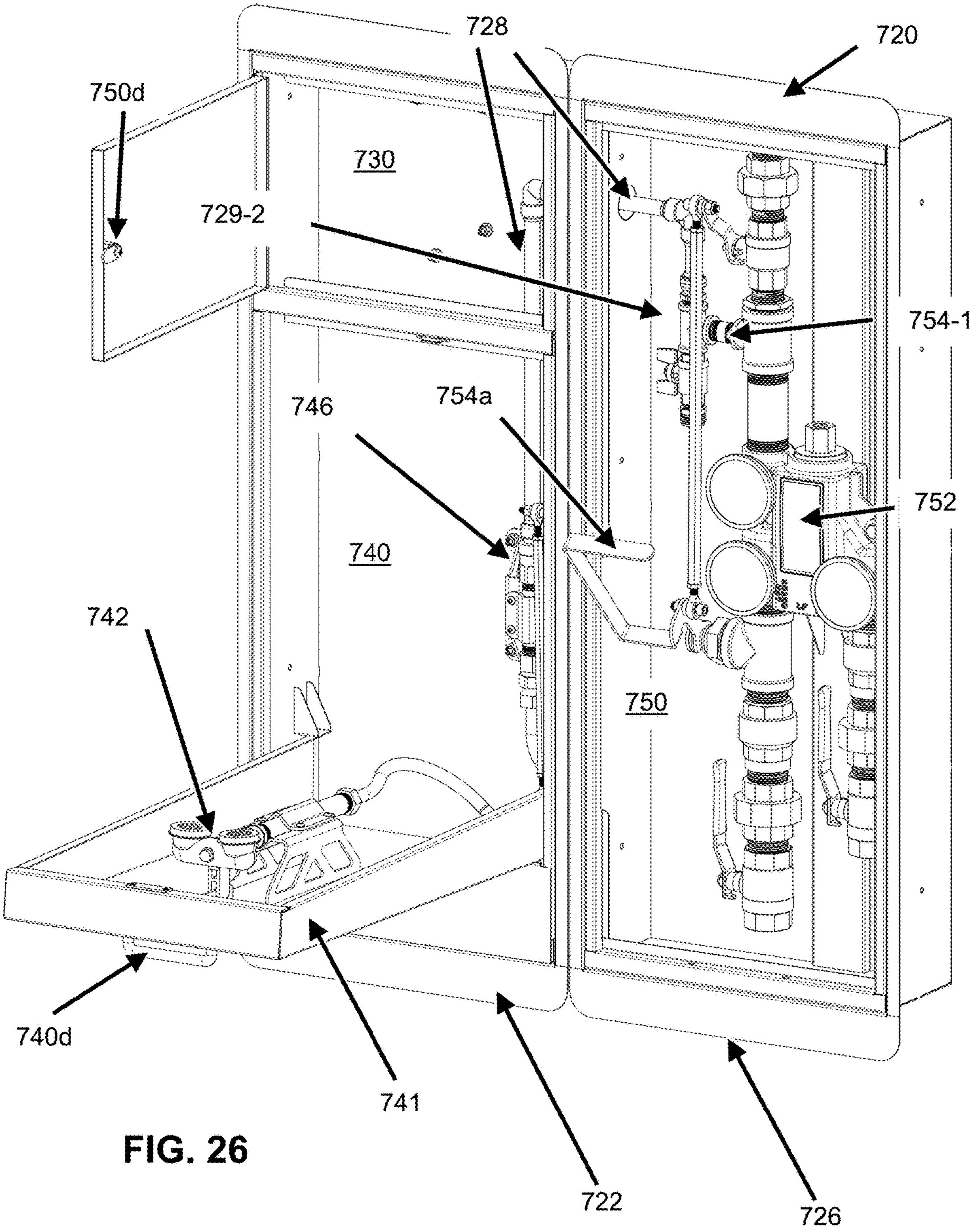
FIG. 26 is a front, top, side perspective view of an emergency eyewash apparatus according to another embodiment of the present invention.

FIG. 26 shows an emergency washing system 720 according to yet another embodiment of the present invention. Various similar apparatus and functions are apparent among the various systems X20 described herein. The differences will now be described.

In one embodiment, system 720 can be a combination of an eyewash cabinet 522 that is placed adjacently to an enclosed shower cabinet 626, or a modification of cabinet 522 placed adjacently to a modification of cabinet 626. The cabinet 722 shown is similar to cabinet 522, except not including a thermostatically controlled mixing valve or flushing valve, the system 720 relying instead on cabinet 726 for those functions.

As shown, the actuation of external handle 754*a* results in the flow of mixed, tempered water to a shower fixture (not shown). Further, the mixed water is further provided to union 729-2, which by way of conduits 728 (preferably PEX supply lines) provide water to the inlet of a shut off valve 746, the outlet of which is directed to the inlet of an eyewash assembly 742. Actuation of lever 754*a* to the open position provides water to the shut off valve 746, which remains in the shut off condition unless the user has pulled open tray 741, the movement of which is interconnected by a linkage to the movable member of the shut off valve 746 in the manner similar to that shown in FIG. 19.

Therefore, in some embodiments, actuation of the emergency shower (by way of moving handle 654*a*) results in the immediate discharge of water from an emergency shower. A second action on the part of the user (the opening of door 740*c*) further provides the emergency eyewash. However, yet other embodiments of the present invention contemplate a system X20 in which a single action on the part of the user results in both an emergency shower, and also provides water for an emergency eyewash. In such embodiments, the eyewash may be attached to a door that further must be opened, or can be provided to an emergency eyewash that is already in a deployed position to be used, or further to an emergency eyewash that receives mixed water even when closed.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

means for discouraging tampering of the various valves.

What is claimed is:

1. A system for emergency washing, comprising:

a first enclosure having a downward pivoting emergency eyewash assembly, a pivoting door attached to the underside of said eyewash assembly, said first enclosure including a shutoff valve having an outlet in fluid communication with said eyewash assembly and an inlet, said first enclosure including a drain;

a shower;

an second enclosure that is located to a side of said first enclosure, a thermostatically controlled mixing valve located within said second enclosure, said mixing valve including an inlet for hotter water, and inlet for colder water, and an outlet for mixed water, said mixing valve providing mixed water to said shower;

a conduit that provides fluid communication from the bottom of said second enclosure to the drain of said first enclosure; and a first fluid flowpath providing fluid communication from the mixing valve outlet to the shutoff valve inlet, and a second fluid flowpath providing fluid communication from the bottom of said second enclosure to the drain.

2. The system of claim 1 which further comprises a third enclosure located above said first enclosure and having a locking door the protects a top enclosed volume, said first flowpath extending through the top enclosed volume.

3. The system of claim 2 wherein said third enclosure includes an electric water heater having an inlet and an outlet providing heated water to the first inlet.

4. The system of claim 1 wherein said second enclosure includes a locking door and a second shutoff valve located within said second enclosure, said shutoff valve receiving mixed water from the outlet of said mixing valve and providing mixed water to said shower when actuated to the opened position, and a handle adapted and configured to actuate said second shutoff valve.

5. The system of claim 1 wherein said pivoting door is adapted and configured to collect water expelled from said eyewash assembly and provide the collected water to the drain.

6. A system for emergency washing, comprising:

a top enclosure having a locking door the protects a first enclosed volume and including a first valve located in the first volume, said first valve including a first inlet for water, a first outlet for providing water from the inlet, and second outlet for providing water from the inlet, said first valve being actuatable between a first position placing the first inlet and first outlet in fluid communication and a second position placing the first inlet and second outlet in fluid communication;

a shower;

a bottom enclosure located underneath said top enclosure and having a downward pivoting emergency eyewash assembly in fluid communication with said first outlet, and a pivoting tray adapted and configured to collect water spraying from said eyewash assembly, said bottom enclosure including a drain in fluid communication with the second outlet;

an adjacent enclosure that is located to the side of said bottom enclosure, and a thermostatically controlled mixing valve located within said adjacent enclosure, said mixing valve providing tempered temperature water to said shower.

7. The system of claim 6 which further comprises a conduit that provides fluid communication from the bottom of said adjacent enclosure to the bottom of said bottom enclosure.

8. The system of claim 6 which further comprises a manual shutoff valve having an outlet in fluid communication with said shower and an inlet receiving tempered water from said mixing valve, said manual shutoff valve including a handle movable from a first position in which said manual shutoff valve is closed to a second position in which said manual shutoff valve provides tempered water to said shower.

9. The system of claim 8 which further comprises a lockable cover from said adjacent enclosure, said manual shutoff valve being protected within said adjacent enclosure by the lockable cover, said lockable cover including an aperture, said handle extending through the aperture.

10. The system of claim 6 wherein said top enclosure includes an electric water heater having an inlet and an outlet providing heated water to the first inlet.

11. The system of claim 6 wherein said first valve is manually actuatable between the first position and the second position.

12. The system of claim 6 wherein in the first position the first inlet and the second outlet are not in fluid communication.

13. The system of claim 6 wherein in the second position the first inlet and the first outlet are in fluid communication.

14. The system of claim 6 wherein said bottom enclosure includes a drain receiving water from said tray.

15. A system for emergency washing, comprising:

an emergency eyewash assembly having an inlet (ee) and at least one outlet (ee) adapted and configured for providing an upwardly directed spray of water;

a shower nozzle adapted and configured for providing a downward spray of water;

a first enclosure having a door covering the interior of said first enclosure;

a thermostatically controlled mixing valve located within the interior, said mixing valve including an inlet (mvh) for hotter water, and inlet (mvc) for colder water, and an outlet (mvo) for mixed water, the outlet (mvo) providing mixed water to the inlet (ee);

a first shutoff valve located within the interior and having an inlet (sv1), an outlet (sv1), and an actuating member (sv1) movable to a first state permitting fluid communication from the inlet (sv1) to the outlet (sv1) and a second state discouraging fluid communication from the inlet (sv1) to the outlet (sv1), the outlet (sv1) being in fluid communication with the inlet (mvh);

a second shutoff valve located within the interior and having an inlet (sv2), an outlet (sv2), and an actuating member (sv2) movable to a first state permitting fluid communication from the inlet (sv2) to the outlet (sv2) and a second state discouraging fluid communication from the inlet (sv2) to the outlet (sv2), the inlet (sv2) being in fluid communication with the outlet (mvo), the outlet (sv2) providing mixed water to said shower nozzle; and a handle movable outside of the interior from a first position to a second position and adapted and configured for actuation of said first shutoff valve and said second shutoff valve;

wherein in the first position the actuating member (sv1) and the actuating member (sv2) are each in the first state, and in the second position the actuating member (sv1) and the actuating member (sv2) are each in the second state.

16. The system of claim 15 wherein said door is lockable and said handle extends through an aperture in said door.

17. The system of claim 15 which further comprises linkage interconnecting said handle, the actuating member (sv1), and the actuating member (sv2).

18. The system of claim 15 which further comprises a pivoting tray for collecting water sprayed by said eyewash assembly, said eyewash assembly being pivotal with said pivoting tray.

19. The system of claim 15 which further comprises a third shutoff valve located having an inlet (sv3), an outlet (sv3), and an actuating member (sv3) movable to a first state permitting fluid communication from the inlet (sv3) to the outlet (sv3) and a second state discouraging fluid communication from the inlet (sv3) to the outlet (sv3), the inlet (sv3) being in fluid communication with outlet (mvo), the outlet (sv3) providing water to inlet (ee).

20. The system of claim 19 wherein said eyewash assembly is pivotal between a stowed position to a deployed position, and said eyewash assembly and said third shutoff valve are interconnected such that movement from the stowed position to the deployed position moves actuating member (sv3) from the first position to the second position.

21. A system for emergency washing, comprising:

a first enclosure having a downward pivoting emergency eyewash assembly, a pivoting door attached to the underside of said eyewash assembly, said first enclosure including a shutoff valve having an outlet in fluid communication with said eyewash assembly and an inlet, said first enclosure including a drain;

a shower;

an second enclosure that is located to a side of said first enclosure, a thermostatically controlled mixing valve located within said second enclosure, said mixing valve including an inlet for hotter water, and inlet for colder water, and an outlet for mixed water, said mixing valve providing mixed water to said shower;

a first fluid flowpath providing fluid communication from the mixing valve outlet to the shutoff valve inlet, and a second fluid flowpath providing fluid communication from the bottom of said second enclosure to the drain; and a third enclosure located above said first enclosure and having a locking door the protects a top enclosed volume, said first flowpath extending through the top enclosed volume.

22. The system of claim 21 wherein said second enclosure includes a locking door and a second shutoff valve located within said second enclosure, said shutoff valve receiving mixed water from the outlet of said mixing valve and providing mixed water to said shower when actuated to the opened position, and a handle adapted and configured to actuate said second shutoff valve.

23. The system of claim 21 wherein said pivoting door is adapted and configured to collect water expelled from said eyewash assembly and provide the collected water to the drain.

24. A system for emergency washing, comprising:

a first enclosure having a downward pivoting emergency eyewash assembly, a pivoting door attached to the underside of said eyewash assembly, said first enclosure including a first shutoff valve having an outlet in fluid communication with said eyewash assembly and an inlet, said first enclosure including a drain;

a shower;

an second enclosure that is located to a side of said first enclosure, a thermostatically controlled mixing valve located within said second enclosure, said mixing valve including an inlet for hotter water, an inlet for colder water, and an outlet for mixed water; and a first fluid flowpath providing fluid communication from the mixing valve outlet to the first shutoff valve inlet, and a second fluid flowpath providing fluid communication from the bottom of said second enclosure to the drain;

wherein said second enclosure includes a locking door and a second shutoff valve located within said second enclosure, said second shutoff valve being actuatable between opened and closed positions and receiving mixed water from the outlet of said mixing valve and providing mixed water to said shower when actuated to the opened position, and a handle adapted and configured to actuate said second shutoff valve.

25. The system of claim 24 wherein said pivoting door is adapted and configured to collect water expelled from said eyewash assembly and provide the collected water to the drain.

26. A system for emergency washing, comprising:

a first enclosure having a downward pivoting emergency eyewash assembly, a pivoting door attached to the underside of said eyewash assembly, said first enclosure including a shutoff valve having an outlet in fluid communication with said eyewash assembly and an inlet, said first enclosure including a drain;

a shower;

an second enclosure that is located to a side of said first enclosure, a thermostatically controlled mixing valve located within said second enclosure, said mixing valve including an inlet for hotter water, and inlet for colder water, and an outlet for mixed water, said mixing valve providing mixed water to said shower; and a first fluid flowpath providing fluid communication from the mixing valve outlet to the shutoff valve inlet, and a second fluid flowpath providing fluid communication from the bottom of said second enclosure to the drain;

wherein said pivoting door is adapted and configured to collect water expelled from said eyewash assembly and provide the collected water to the drain.

* * * * *